(12) United States Patent
Wang

(10) Patent No.: US 10,921,559 B2
(45) Date of Patent: Feb. 16, 2021

(54) CAMERA LENS ASSEMBLY

(71) Applicant: Zhejiang Sunny Optical Co., Ltd, Ningbo (CN)

(72) Inventor: Xinquan Wang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 148 days.

(21) Appl. No.: 16/224,648

(22) Filed: Dec. 18, 2018

(65) Prior Publication Data

US 2019/0146187 A1 May 16, 2019

Related U.S. Application Data

(63) Continuation of application No. PCT/CN2018/085625, filed on May 4, 2018.

(30) Foreign Application Priority Data

Sep. 13, 2017 (CN) .......................... 2017 1 0820117
Sep. 13, 2017 (CN) ..................... 2017 2 1167172 U

(51) Int. Cl.
  *G02B 13/00* (2006.01)
  *G02B 9/60* (2006.01)

(52) U.S. Cl.
  CPC .......... *G02B 13/0045* (2013.01); *G02B 9/60* (2013.01)

(58) Field of Classification Search
  CPC .... G02B 9/60; G02B 13/0045; G02B 13/002; G02B 3/02; G02B 3/04
  USPC .......................... 359/763, 764, 767, 714, 713
  See application file for complete search history.

(56) References Cited

U.S. PATENT DOCUMENTS

| | | | | |
|---|---|---|---|---|
| 2016/0170176 A1* | 6/2016 | Liao | ...................... | H04N 5/2254 348/360 |
| 2016/0195693 A1* | 7/2016 | Tang | .................. | G02B 13/0045 359/714 |
| 2016/0195695 A1* | 7/2016 | Tang | .................. | G02B 13/0045 359/714 |

FOREIGN PATENT DOCUMENTS

| | | |
|---|---|---|
| CN | 103018887 | 4/2013 |
| CN | 105739060 | 7/2016 |
| CN | 106896481 | 6/2017 |
| CN | 107153257 | 9/2017 |
| CN | 107462976 | 12/2017 |
| CN | 207123645 | 3/2018 |
| WO | 2015005417 | 1/2015 |

* cited by examiner

*Primary Examiner* — Marin Pichler
(74) *Attorney, Agent, or Firm* — Hauptman Ham, LLP

(57) ABSTRACT

The present disclosure discloses a camera lens assembly. The camera lens assembly includes, sequentially along an optical axis from an object side to an image side, a first lens, a second lens, a third lens, a fourth lens, and a fifth lens. The first lens has a positive refractive power, an object-side surface of the first lens is a convex surface, and an image-side surface of the first lens is a concave surface. Each of the second lens and the third lens has a positive refractive power or a negative refractive power. The fourth lens has a positive refractive power, and an image-side surface of the fourth lens is a convex surface. The fifth lens has a negative refractive power, and an object-side surface of the fifth lens is a concave surface. An effective semi-diameter DT52 of an image-side surface of the fifth lens and half of a diagonal length ImgH of an effective pixel area on an image plane of the camera lens assembly satisfy: $0.75<DT52/ImgH<1$.

18 Claims, 9 Drawing Sheets

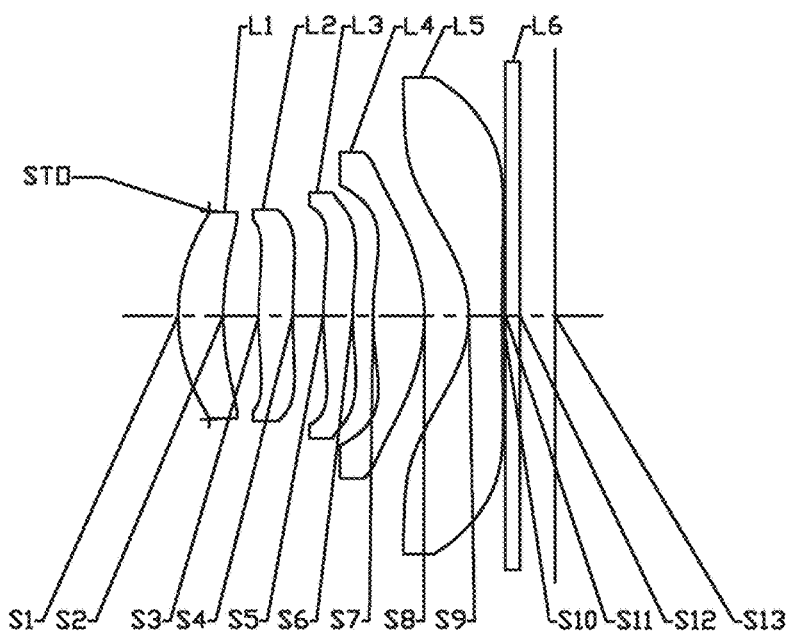
Fig. 5
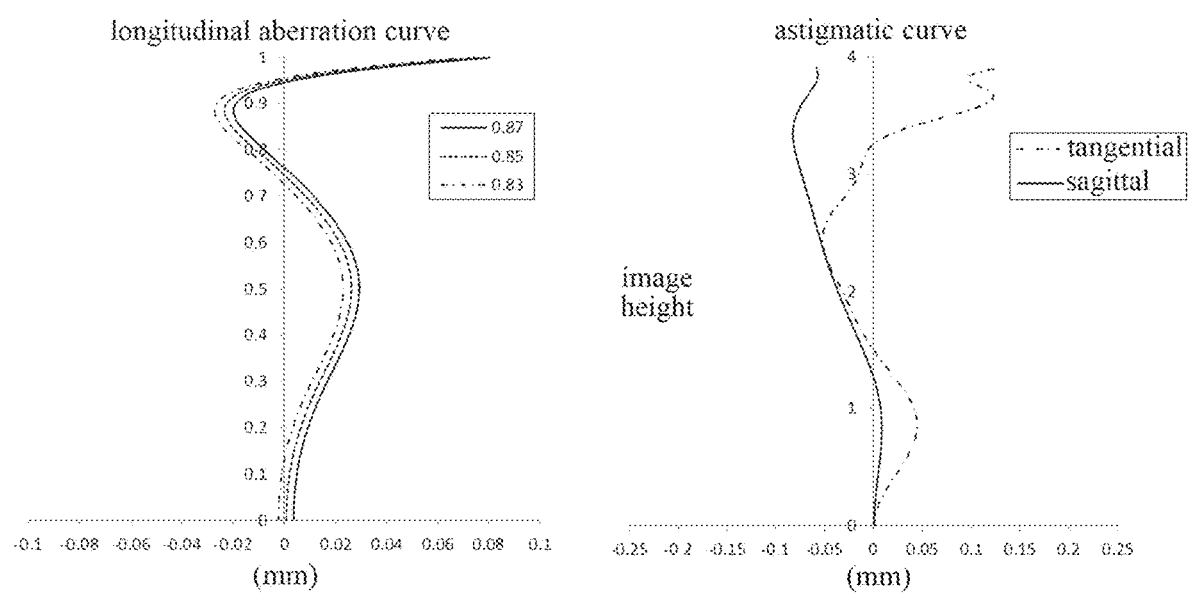
Fig. 6A                              Fig. 6B

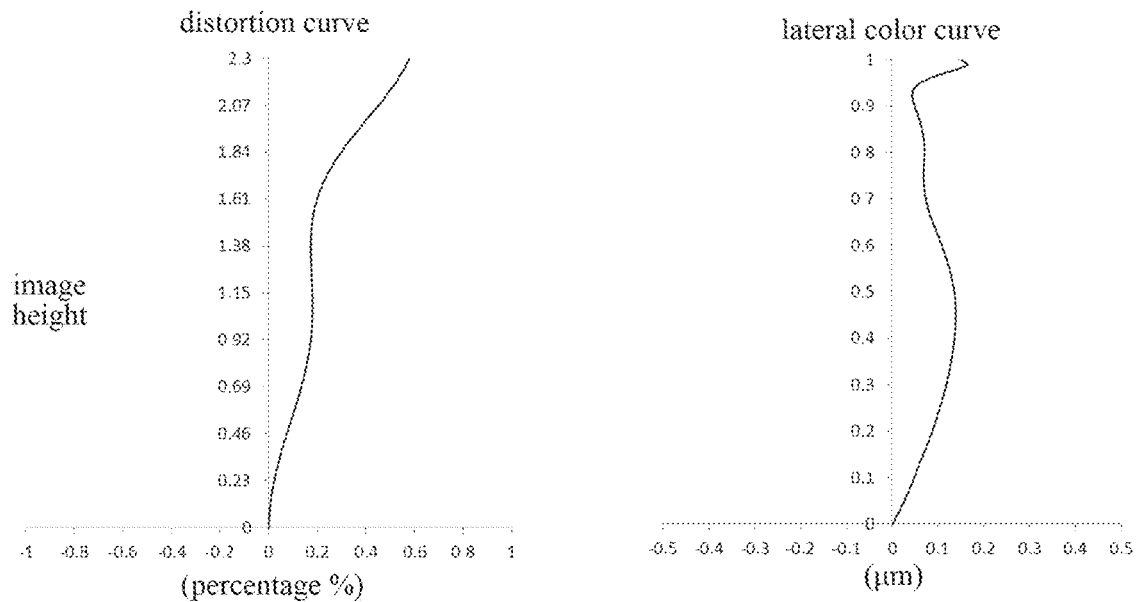
Fig. 6C
Fig. 6D
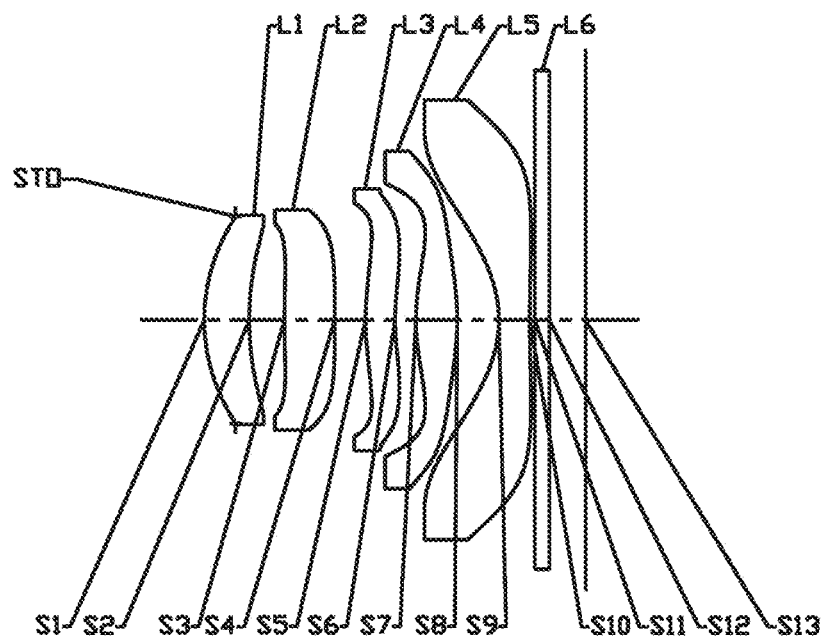
Fig. 7

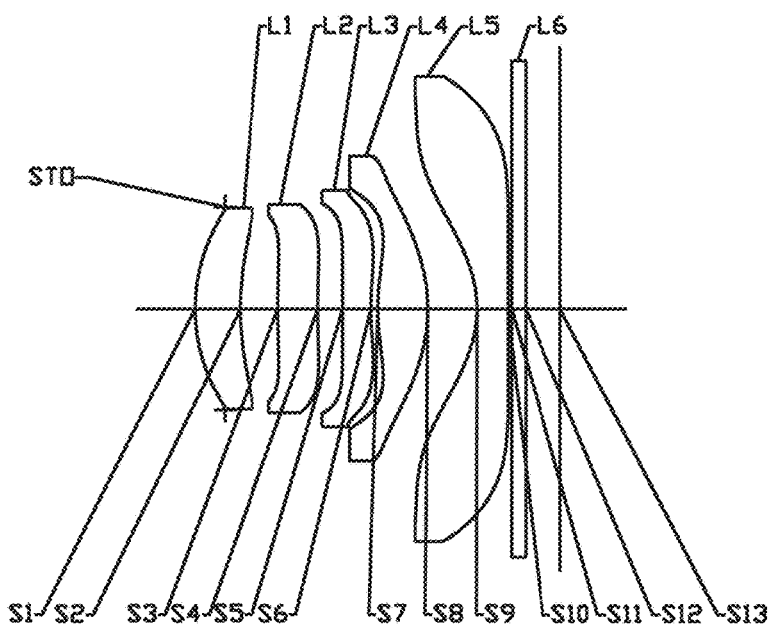
Fig. 9
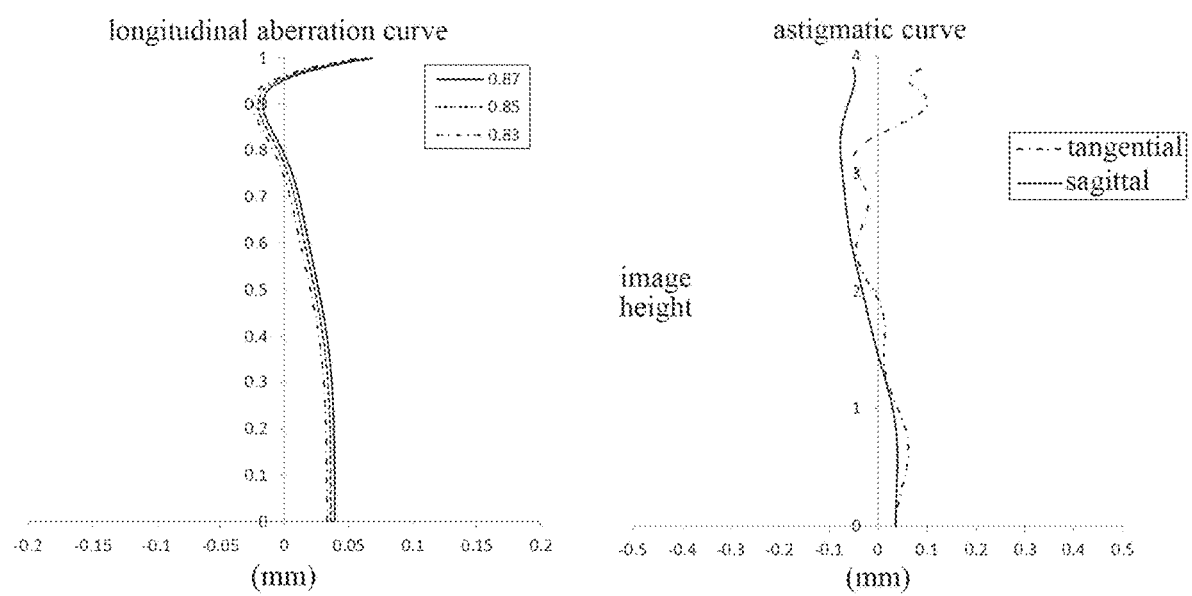
Fig. 10A
Fig. 10B

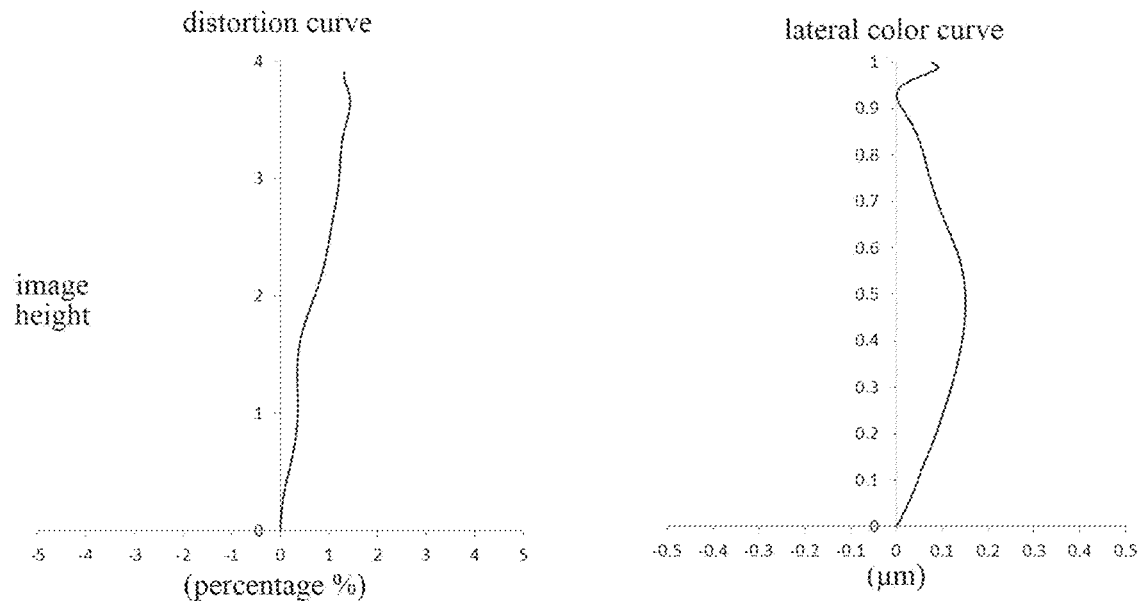
Fig. 10C
Fig. 10D
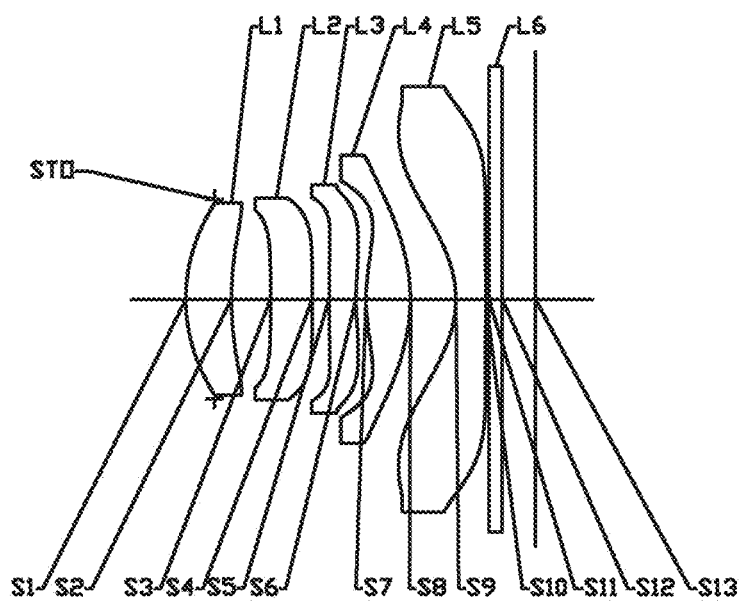
Fig. 11

CAMERA LENS ASSEMBLY

CROSS-REFERENCE TO RELATED APPLICATIONS

This application is a continuation of International Application No. PCT/CN2018/085625, filed on May 4, 2018, which claims the priorities and rights to Chinese Patent Application No. 201710820117.8 and Chinese Patent Application No. 201721167172.3 filed with the China National Intellectual Property Administration (CNIPA) on Sep. 13, 2017. All of the aforementioned applications are hereby incorporated by reference in their entireties.

TECHNICAL FIELD

The present disclosure relates to a camera lens assembly, and more specifically to a camera lens assembly including five lenses and having a large aperture.

BACKGROUND

With the improvement on performance and reduction in size of the commonly used photosensitive elements such as charge-coupled devices (CCD) or complementary metal-oxide semiconductor elements (CMOS), higher requirements on high imaging quality and miniaturization of the counterpart camera lens assemblies have been brought forward.

Meanwhile, since the commonly used photosensitive elements can be used in the infrared range, the application of the lens assembly is extended to the fields of infrared imaging, distance detection, infrared identification, and the like. An existing miniaturized camera lens assembly usually has a large F-number Fno, resulting in a small amount of light admitted. Accordingly, the accuracy of detection and identification cannot be ensured. In order to better meet the requirements on the lens assembly in the fields of detection, identification, etc., the camera lens assembly also needs to have a large aperture while ensuring a small size.

SUMMARY

The present disclosure provides a camera lens assembly which may be applicable to portable electronic products and may at least or partially solve at least one of the above disadvantages in the existing technology.

According to an aspect, the present disclosure provides a camera lens assembly. The camera lens assembly includes, sequentially along an optical axis from an object side to an image side, a first lens, a second lens, a third lens, a fourth lens, and a fifth lens. The first lens may have a positive refractive power, an object-side surface of the first lens may be a convex surface, and an image-side surface of the first lens may be a concave surface. Each of the second lens and the third lens has a positive refractive power or a negative refractive power. The fourth lens may have a positive refractive power, and an image-side surface of the fourth lens may be a convex surface. The fifth lens may have a negative refractive power, and an object-side surface of the fifth lens may be a concave surface. An effective semi-diameter DT52 of an image-side surface of the fifth lens and half of a diagonal length ImgH of an effective pixel area on an image plane of the camera lens assembly may satisfy: $0.75<DT52/ImgH<1$.

In an implementation, a total effective focal length f of the camera lens assembly and an entrance pupil diameter EPD of the camera lens assembly may satisfy: $f/EPD<1.6$.

In an implementation, an effective focal length f1 of the first lens and the total effective focal length f of the camera lens assembly may satisfy: $1.4<f1/f<2$.

In an implementation, a radius of curvature R1 of the object-side surface of the first lens and a radius of curvature R2 of the image-side surface of the first lens may satisfy: $-5<(R1+R2)/(R1-R2)<-3$.

In an implementation, a radius of curvature R8 of the image-side surface of the fourth lens and a radius of curvature R9 of the object-side surface of the fifth lens may satisfy: $1.2<R8/R9<3.5$.

In an implementation, the radius of curvature R9 of the object-side surface of the fifth lens and an effective focal length f5 of the fifth lens may satisfy: $0<R9/f5<0.8$.

In an implementation, the radius of curvature R9 of the object-side surface of the fifth lens and the total effective focal length f of the camera lens assembly may satisfy: $R9/f>-0.5$.

In an implementation, a center thickness CT1 of the first lens on the optical axis and a center thickness CT4 of the fourth lens on the optical axis may satisfy: $0.6<CT1/CT4<1.1$.

In an implementation, a center thickness CT3 of the third lens on the optical axis and a center thickness CT5 of the fifth lens on the optical axis may satisfy: $0.8<CT3/CT5<1.2$.

In an implementation, a spacing distance T12 on the optical axis between the first lens and the second lens, a spacing distance T23 on the optical axis between the second lens and the third lens, and a spacing distance T34 on the optical axis between the third lens and the fourth lens may satisfy: $0.1<T34/(T12+T23)<0.5$.

In an implementation, an axial distance TTL from the object-side surface of the first lens to the image plane of the camera lens assembly and the half of the diagonal length ImgH of the effective pixel area on the image plane of the camera lens assembly may satisfy: $TTL/ImgH<1.6$.

In an implementation, a distance SAG51 on the optical axis from an intersection of the object-side surface of the fifth lens and the optical axis to a vertex of an effective semi-diameter of the object-side surface of the fifth lens, and a distance SAG52 on the optical axis from an intersection of the image-side surface of the fifth lens and the optical axis to a vertex of the effective semi-diameter of the image-side surface of the fifth lens may satisfy: $0.8<SAG51/SAG52<1.8$.

In an implementation, the first lens may be a glass lens, and a thermal expansion coefficient TCE1 of the first lens may satisfy: $TCE1<15\times10^{-6}/°C$.

According to another aspect, the present disclosure further provides a camera lens assembly. The camera lens assembly includes, sequentially along an optical axis from an object side to an image side, a first lens, a second lens, a third lens, a fourth lens, and a fifth lens. An object-side surface of the first lens may be a convex surface, and an image-side surface of the first lens may be a concave surface. At least one of an object-side surface of the second lens or an image-side surface of the second lens may be a convex surface. At least one of an object-side surface of the third lens or an image-side surface of the third lens may be a concave surface. The fourth lens may have a positive refractive power, and an image-side surface of the fourth lens may be a convex surface. The fifth lens has a negative refractive power, and an object-side surface of the fifth lens may be a concave surface. A distance SAG51 on the optical axis from an intersection of the object-side surface of the fifth lens and the optical axis to a vertex of an effective semi-diameter of the object-side surface of the fifth lens, and a distance SAG52 on the optical axis from an intersection of an image-side surface of the fifth lens and the optical axis to a vertex of an effective semi-diameter of the image-side surface of the fifth lens may satisfy: 0.8<SAG51/SAG52<1.8.

In an implementation, the first lens may have a positive refractive power.

According to another aspect, the present disclosure further provides a camera lens assembly. The camera lens assembly includes, sequentially along an optical axis from an object side to an image side, a first lens, a second lens, a third lens, a fourth lens, and a fifth lens. The first lens may have a positive refractive power, an object-side surface of the first lens may be a convex surface, and an image-side surface of the first lens may be a concave surface. Each of the second lens and the third lens has a positive refractive power or a negative refractive power. The fourth lens may have a positive refractive power, and an image-side surface of the fourth lens may be a convex surface. The fifth lens may have a negative refractive power, and an object-side surface of the fifth lens may be a concave surface. A total effective focal length f of the camera lens assembly and an entrance pupil diameter EPD of the camera lens assembly may satisfy: f/EPD<1.6. An axial distance TTL from the object-side surface of the first lens to an image plane of the camera lens assembly and half of a diagonal length ImgH of an effective pixel area on the image plane of the camera lens assembly may satisfy: TTL/ImgH<1.6.

By reasonably distributing the refractive powers and the surface types of the lenses, the center thicknesses of the lenses, and the spacing distances on the axis between the lenses, etc., the camera lens assembly has at least one of the beneficial effects of miniaturization, low sensitivity, or large-aperture while achieving the good imaging quality.

BRIEF DESCRIPTION OF THE DRAWINGS

By describing non-limiting implementations below in detail with reference to the accompanying drawings, other features, objectives and advantages of the present disclosure will be more apparent. In the accompanying drawings:

FIG. 5 is a schematic structural diagram illustrating a camera lens assembly according to Embodiment 3 of the present disclosure;

FIGS. 6A-6D respectively illustrate a longitudinal aberration curve, an astigmatic curve, a distortion curve, and a lateral color curve of the camera lens assembly according to Embodiment 3;

FIG. 7 is a schematic structural diagram illustrating a camera lens assembly according to Embodiment 4 of the present disclosure;

FIG. 9 is a schematic structural diagram illustrating a camera lens assembly according to Embodiment 5 of the present disclosure;

FIGS. 10A-10D respectively illustrate a longitudinal aberration curve, an astigmatic curve, a distortion curve, and a lateral color curve of the camera lens assembly according to Embodiment 5;

FIG. 11 is a schematic structural diagram illustrating a camera lens assembly according to Embodiment 6 of the present disclosure.

DETAILED DESCRIPTION

Figure 1:
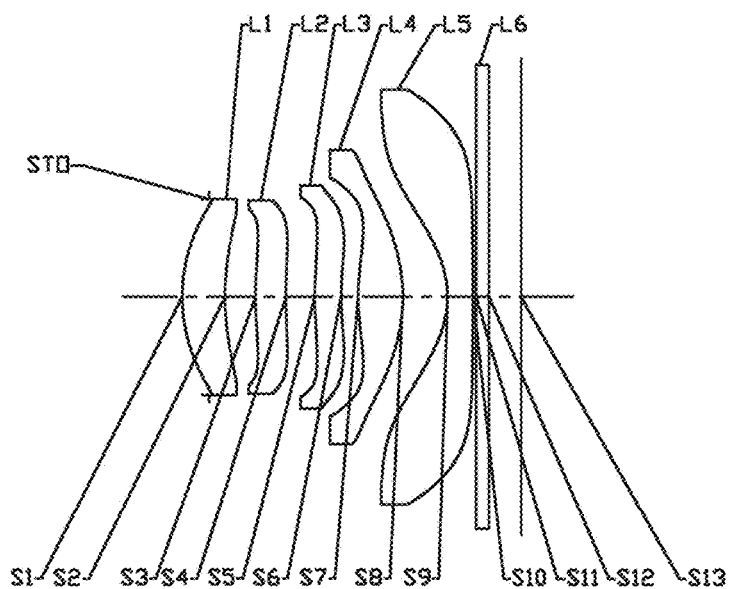
FIG. 1 is a schematic structural diagram illustrating a camera lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The camera lens assembly according to exemplary implementations of the present disclosure includes, for example, five lenses (i.e., a first lens, a second lens, a third lens, a fourth lens, and a fifth lens) having refractive powers. The five lenses are arranged in sequence along an optical axis from an object side to an image side. The camera lens assembly may further include a photosensitive element disposed on the image plane.

The first lens may have a positive refractive power, an object-side surface of the first lens may be a convex surface, and an image-side surface of the first lens may be a concave surface. The refractive power and the surface types of the first lens are reasonably arranged, which is conductive to correcting the spherical aberrations of the imaging system, and shortening the total track length of the imaging system.

An effective focal length f1 of the first lens and a total effective focal length f of the camera lens assembly may satisfy: 1.4<f1/f<2, and more specifically, f1 and f may further satisfy: 1.43≤f1/f≤1.74. Satisfying the conditional expression 1.4<f1/±<2 is conductive to shortening the total length of the imaging system.

A radius of curvature R1 of the object-side surface of the first lens and a radius of curvature R2 of the image-side surface of the first lens may satisfy: −5<(R1+R2)/(R1−R2)<−3, and more specifically, R1 and R2 may further satisfy: −4.48≤(R1+R2)/(R1−R2)≤−3.17. Satisfying the conditional expression −5<(R1+R2)/(R1−R2)<−3 helps to control the spherical aberration generated by the first lens within a reasonable range. At the same time, it is conductive to shortening the total length of the imaging system.

The first lens may be a glass lens, and a thermal expansion coefficient TCE1 of the first lens may satisfy: TCE1<15× $10^{-6}/°$ C. The glass material usually has a high refractive index. The use of the glass material may ease the curvature of the surface of the lens, which is conductive to the production and processing of the lens. Meanwhile, the temperature coefficient of refractive index of the glass material changes little. Accordingly, in the application where the environmental temperature changes, the use of the glass lens is conductive to maintaining the stability of the image plane and is conductive to improving the heat resistance of the imaging system.

The second lens has a positive refractive power or a negative refractive power. At least one of an object-side surface of the second lens or an image-side surface of the second lens may be a convex surface.

The third lens has a positive refractive power or a negative refractive power. At least one of an object-side surface of the third lens or an image-side surface of the third lens may be a concave surface. Alternatively, the third lens may have a negative refractive power and the image-side surface of the third lens may be a concave surface.

The fourth lens may have a positive refractive power. An object-side surface of the fourth lens may be a convex surface, and an image-side surface of the fourth lens may be a convex surface. The refractive power and the surface types of the fourth lens are reasonably arranged, which is conductive to dispersing the refractive powers of the imaging system, and reducing the tolerance sensitivity of the imaging system.

The fifth lens may have a negative refractive power and an object-side surface of the fifth lens may be a concave surface. The refractive power and the surface types of the fifth lens are reasonably arranged, which is conductive to shortening the total length of the imaging system, thereby achieving the miniaturization.

A radius of curvature R8 of the image-side surface of the fourth lens and a radius of curvature R9 of the object-side surface of the fifth lens may satisfy: 1.2<R8/R9<3.5, and more specifically, R8 and R9 may further satisfy: 1.23≤R8/R9≤2.25. Satisfying the conditional expression 1.2<R8/R9<3.5 is conductive to correcting the astigmatism generated by the optical imaging system and reducing the aberrations.

The radius of curvature R9 of the object-side surface of the fifth lens and an effective focal length f5 of the fifth lens may satisfy: 0<R9/f5<0.8, and more specifically, R9 and f5 may further satisfy: 0.52≤R9/f5≤0.62. Satisfying the conditional expression 0<R9/f5<0.8 is conductive to the processing and shaping of the lens and shortening the total track length of the imaging system.

The radius of curvature R9 of the object-side surface of the fifth lens and the total effective focal length f of the camera lens assembly may satisfy: R9/f>−0.5, and more specifically, R9 and f may further satisfy: −0.42≤R9/f≤−0.38. Satisfying the conditional expression R9/f>−0.5 helps the image plane at the image side to move toward the object side, which is conductive to shortening the total track length of the imaging system, so that the system has the miniaturization characteristic.

An effective semi-diameter DT52 of an image-side surface of the fifth lens and half of a diagonal length ImgH of an effective pixel area on the image plane of the camera lens assembly may satisfy: 0.75<DT52/ImgH<1, and more specifically, DT52 and ImgH may further satisfy: 0.81≤DT52/ImgH≤0.90. Satisfying the conditional expression 0.75<DT52/ImgH<1 is conductive to the processing and shaping of the fifth lens and shortening the total track length of the imaging system.

A distance SAG51 on the optical axis from an intersection of the object-side surface of the fifth lens and the optical axis to a vertex of an effective semi-diameter of the object-side surface of the fifth lens and a distance SAG52 on the optical axis from an intersection of the image-side surface of the fifth lens and the optical axis to a vertex of the effective semi-diameter of the image-side surface of the fifth lens may satisfy: 0.8<SAG51/SAG52<1.8, and more specifically, SAG51 and SAG52 may further satisfy: 0.95<SAG51/SAG52≤1.77. Satisfying the conditional expression $0.8<SAG51/SAG52<1.8$ is conductive to the processing and shaping of the lens and the miniaturization of the lens assembly.

In the application, the center thicknesses of the lenses and the spacing distances between the lenses may also be optimized to improve the optical performances of the lens assembly.

The center thickness CT1 of the first lens on the optical axis and the center thickness CT4 of the fourth lens on the optical axis may satisfy: $0.6<CT1/CT4<1.1$, and more specifically, CT1 and CT4 may further satisfy: $0.65 \leq CT1/CT4 \leq 1.09$, Satisfying the conditional expression $0.6<CT1/CT4<1.1$ is conductive to dispersing the refractive powers of the system, processing and shaping the lenses, and reducing the tolerance sensitivity of the system.

The center thickness CT3 of the third lens on the optical axis and the center thickness CT5 of the fifth lens on the optical axis may satisfy: $0.8<CT3/CT5<1.2$, and more specifically, CT3 and CT5 may further satisfy: $0.88 \leq CT3/CT5 \leq 1.16$. Satisfying the conditional expression $0.8<CT3/CT5<1.2$ is conductive to reasonably distributing the space on the axis, and thus the processing and shaping of the lenses and the total track length of the imaging system are better balanced, so that the lens assembly can have a total track length as short as possible while having a good processibility.

The spacing distance T12 on the optical axis between the first lens and the second lens, the spacing distance T23 on the optical axis between the second lens and the third lens, and the spacing distance T34 on the optical axis between the third lens and the fourth lens may satisfy: $0.1<T34/(T12+T23)<0.5$, and more specifically, T12, T23, and T34 may further satisfy: $0.11 \leq T34/(T12+T23) \leq 0.32$. Satisfying the conditional expression $0.1<T34/(T12+T23)<0.5$ is conductive to the assembly of the lenses, which is conductive to improving the production yield of the lens assembly and shortening the total track length of the system.

The total effective focal length f of the camera lens assembly and an entrance pupil diameter EPD of the camera lens assembly may satisfy: $f/EPD<1.6$, and more specifically, f and EPD may further satisfy: $1.26 \leq f/EPD \leq 1.38$. Satisfying the conditional expression $f/EPD<1.6$ may effectively improve the energy density on the image plane, thereby improving the signal-to-noise ratio of the output signal of the image sensor (i.e., improving the infrared imaging quality or the accuracy of the identification and the detection.

Alternatively, the camera lens assembly may further include an optical filter. The optical filter may be an infrared bandpass filter.

Alternatively, the camera lens assembly may further include a protective glass for protecting the photosensitive element on the image plane.

The camera lens assembly according to the above implementations of the present disclosure may adopt multiple lenses, for example, five lenses described above. By reasonably distributing the refractive powers and the surface types of the lenses, the center thicknesses of the lenses, the spacing distances on the axis between the lenses, etc., it is possible to effectively reduce the size of the lens assembly, reduce the sensitivity of the lens assembly, and improve the processability of the lens assembly, so that the camera lens assembly is more conductive to the production and processing and applicable to the portable electronic products. Meanwhile, with the above configuration, the camera lens assembly further has beneficial effects such as large-aperture, and high imaging quality. Accordingly, the camera lens assembly can be better applied in the fields of infrared detection and identification.

In the implementations of the present disclosure, at least one of the surfaces of each lens is an aspheric surface The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the camera lens assembly without departing from the technical solution claimed by the present disclosure. For example, although the camera lens assembly having five lenses is described as an example in the implementations, the camera lens assembly is not limited to include five lenses. If desired, the camera lens assembly may also include other numbers of lenses.

Specific embodiments of the camera lens assembly that may be applied to the above implementations are further described below with reference to the accompanying drawings.

Embodiment 1

A camera lens assembly according to Embodiment 1 of the present disclosure is described below with reference to FIGS. 1-2D. FIG. 1 is a schematic structural diagram illustrating the camera lens assembly according to Embodiment 1 of the present disclosure.

As shown in FIG. 1, the camera lens assembly includes, sequentially along an optical axis from an object side to an image side, a first lens L1, a second lens L2, a third lens L3, a fourth lens L4, a fifth lens L5, and an image plane S13.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces. The first lens may be a glass lens, and a thermal expansion coefficient TCE1 of the first lens satisfies: $TCE1=6.50 \times 10^{-6}/° C$.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a negative refractive power, an object-side surface S5 of the third lens L3 is a convex surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a negative refractive power, an object-side surface S9 of the fifth lens L5 is a concave surface, and an image-side surface S10 of the fifth lens L5 is a convex surface. The object-side surface S9 and the image-side surface S10 of the fifth lens L5 are both aspheric surfaces.

Alternatively, the camera lens assembly may further include an optical filter L6 having an object-side surface S11 and an image-side surface S12. Light from an object sequentially passes through the surfaces S1-S12 and finally forms an image on the image plane S13.

Alternatively, a diaphragm STO for limiting light beams may be disposed between the object side and the first lens L1, to improve the imaging quality of the camera lens assembly.

Table 1 shows the surface type, the radius of curvature, the thickness, the material and the conic coefficient of each lens of the camera lens assembly in Embodiment 1. The radius of curvature and the thickness are both shown in millimeters (mm).

TABLE 1

| surface number | surface type | radius of curvature | thickness | material refractive index | abbe number | conic coefficient |
|---|---|---|---|---|---|---|
| OBJ | spherical | infinite | 632.0000 | | | |
| STO | spherical | infinite | −0.4360 | | | |
| S1 | aspheric | 2.6553 | 0.6914 | 1.84 | 40.6 | −1.3893 |
| S2 | aspheric | 4.1813 | 0.5060 | | | 0.0000 |
| S3 | aspheric | 6.9071 | 0.4935 | 1.53 | 55.8 | 0.0000 |
| S4 | aspheric | 10.5342 | 0.4649 | | | 10.5843 |
| S5 | aspheric | 5.1666 | 0.4250 | 1.53 | 55.8 | 0.0000 |
| S6 | aspheric | 3.5700 | 0.2765 | | | 0.0000 |
| S7 | aspheric | 3.4455 | 0.7225 | 1.53 | 55.8 | 0.0000 |
| S8 | aspheric | −2.7417 | 0.7237 | | | 0.0437 |
| S9 | aspheric | −1.5672 | 0.4119 | 1.53 | 55.8 | −1.1277 |
| S10 | aspheric | −118.6260 | 0.0500 | | | 0.0000 |
| S11 | spherical | infinite | 0.2100 | 1.52 | 64.2 | |
| S12 | spherical | infinite | 0.5244 | | | |
| S13 | spherical | infinite | | | | |

As may be obtained from Table 1, the radius of curvature R1 of the object-side surface S1 of the first lens L1 and the radius of curvature R2 of the image-side surface S2 of the first lens L1 satisfy: $(R1+R2)/(R1−R2)=−4.48$. The radius of curvature R8 of the image-side surface S8 of the fourth lens L4 and the radius of curvature R9 of the object-side surface S9 of the fifth lens L5 satisfy: $R8/R9=1.75$. The center thickness CT1 of the first lens L1 on the optical axis and the center thickness CT4 of the fourth lens L4 on the optical axis satisfy: $CT1/CT4=0.96$. The center thickness CT3 of the third lens L3 on the optical axis and the center thickness CT5 of the fifth lens L5 on the optical axis satisfy: $CT3/CT5=1.03$. The spacing distance T12 on the optical axis between the first lens L1 and the second lens L2, the spacing distance T23 on the optical axis between the second lens L2 and the third lens L3, and the spacing distance T34 on the optical axis between the third lens L3 and the fourth lens L4 satisfy: $T34/(T12+T23)=0.27$.

In this embodiment, the surface type x of each aspheric surface is defined by the following formula:

$$x = \frac{ch^2}{1+\sqrt{1-(k+1)c^2h^2}} + \sum A_i h^i. \quad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the aspheric surfaces S1-S10 in Embodiment 1.

TABLE 2

| surface number | A4 | A6 | A8 | A10 | A12 |
|---|---|---|---|---|---|
| S1 | 6.7023E−03 | 2.3208E−03 | −1.7264E−03 | 2.6033E−04 | 1.0806E−04 |
| S2 | −1.3894E−04 | −7.8632E−03 | 4.9290E−03 | −2.4302E−03 | 2.0504E−04 |
| S3 | −8.3620E−03 | −4.9907E−02 | 5.9183E−02 | −5.1623E−02 | 2.3988E−02 |
| S4 | −2.9484E−02 | 1.7080E−02 | −3.2490E−02 | 2.2400E−02 | −1.0689E−02 |
| S5 | −1.1570E−01 | 1.2672E−01 | −1.1433E−01 | 6.1601E−02 | −1.8420E−02 |
| S6 | −1.5755E−01 | 7.7283E−02 | 8.3797E−03 | −6.1712E−02 | 4.6558E−02 |
| S7 | −8.9066E−02 | 4.1769E−02 | −3.2736E−02 | 1.7530E−02 | −6.5927E−03 |
| S8 | 1.6309E−02 | −2.0132E−03 | 1.5360E−04 | 8.3524E−05 | 1.4589E−05 |
| S9 | 2.1370E−02 | 7.3852E−04 | −6.5440E−05 | −1.2698E−05 | 8.2656E−07 |
| S10 | −3.8646E−03 | 2.3051E−03 | −7.9045E−04 | 9.1052E−05 | −4.7846E−06 |

| surface number | A14 | A16 | A18 | A20 |
|---|---|---|---|---|
| S1 | −2.6534E−05 | −1.0213E−05 | 0.0000E+00 | 0.0000E+00 |
| S2 | 0.0000E+00 | 0.0000E+00 | 0.0000E+00 | 0.0000E+00 |
| S3 | −6.0692E−03 | 5.8357E−04 | 0.0000E+00 | 0.0000E+00 |
| S4 | 2.7910E−03 | −3.0149E−04 | 0.0000E+00 | 0.0000E+00 |
| S5 | 2.0905E−03 | 0.0000E+00 | 0.0000E+00 | 0.0000E+00 |
| S6 | −1.5156E−02 | 1.7308E−03 | 1.3237E−04 | −3.0833E−05 |
| S7 | 1.3509E−03 | −1.0931E−04 | 0.0000E+00 | 0.0000E+00 |
| S8 | −3.6784E−06 | 0.0000E+00 | 0.0000E+00 | 0.0000E+00 |
| S9 | 0.0000E+00 | 0.0000E+00 | 0.0000E+00 | 0.0000E+00 |
| S10 | 9.5023E−08 | 0.0000E+00 | 0.0000E+00 | 0.0000E+00 |

Table 3 below shows the total effective focal length f of the camera lens assembly in Embodiment 1, the effective focal lengths f1-f5 of the lenses, the total track length TTL (i.e., the distance on the optical axis from the object-side surface S1 of the first lens L1 to the image plane S13), and the half of the diagonal length ImgH of the effective pixel area on the image plane S13 of the camera lens assembly.

TABLE 3

| parameter | f (mm) | f1 (mm) | f2 (mm) | f3 (mm) | f4 (mm) | f5 (mm) | TTL (mm) | ImgH (mm) |
|---|---|---|---|---|---|---|---|---|
| numerical value | 4.15 | 7.20 | 36.32 | −24.11 | 3.02 | −3.01 | 5.50 | 3.94 |

In Embodiment 1, the effective focal length f1 of the first lens L1 and the total effective focal length f of the camera lens assembly satisfy: f1/f=1.74. The total track length TTL of the camera lens assembly and the half of the diagonal length ImgH of the effective pixel area on the image plane S13 of the camera lens assembly satisfy: TTL/ImgH=1.39. The radius of curvature R9 of the object-side surface S9 of the fifth lens L5 and the total effective focal length f of the camera lens assembly satisfy: R9/f=−0.38. The radius of curvature R9 of the object-side surface S9 of the fifth lens L5 and the effective focal length f5 of the fifth lens L5 satisfy: R9/f5=0.52. The total effective focal length f of the camera lens assembly and the entrance pupil diameter EPD of the camera lens assembly satisfy: f/EPD=1.30. The effective semi-diameter DT52 of the image-side surface S10 of the fifth lens L5 and the half of the diagonal length ImgH of the effective pixel area on the image plane S13 of the camera lens assembly satisfy: DT52/ImgH=0.85. The distance SAG51 on the optical axis from the intersection of the object-side surface S9 of the fifth lens L5 and the optical axis to the vertex of the effective semi-diameter of the object-side surface S9 of the fifth lens L5, and the distance SAG52 on the optical axis from the intersection of the image-side surface S10 of the fifth lens L5 and the optical axis to the vertex of the effective semi-diameter of the image-side surface S10 of the fifth lens L5 satisfy: SAG51/SAG52−1.01.

Figures 2A, 2B:
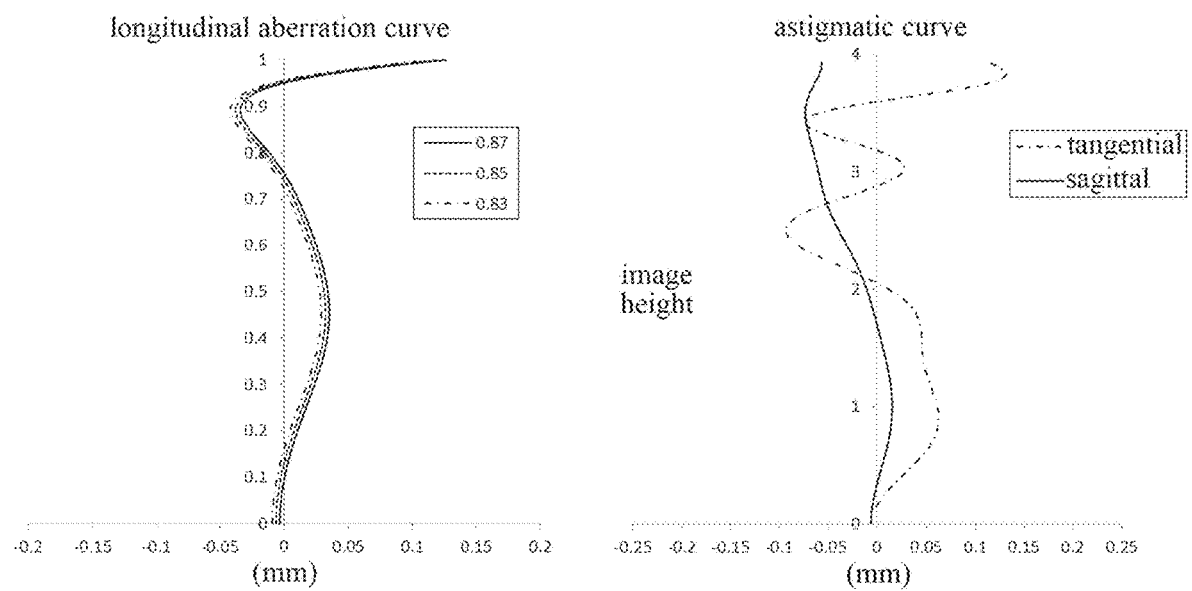
FIGS. 2A-2D respectively illustrate a longitudinal aberration curve, an astigmatic curve, a distortion curve, and a lateral color curve of the camera lens assembly according to Embodiment 1.
Figures 2C, 2D:
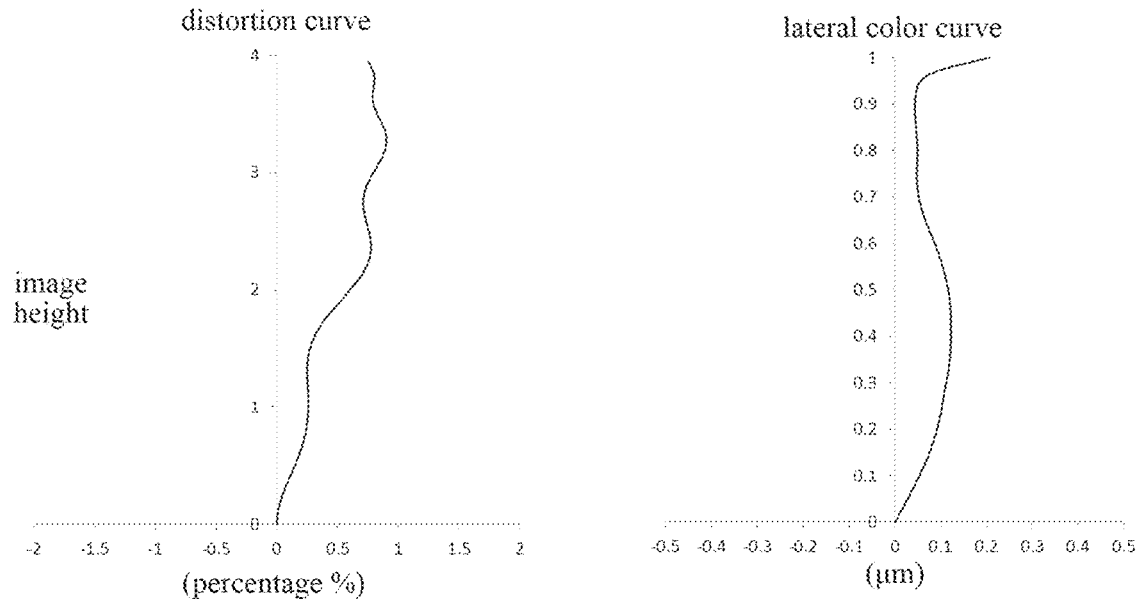

FIG. 2A illustrates the longitudinal aberration curve of the camera lens assembly according to Embodiment 1, representing deviations of the focal points of the light of different wavelengths converged after passing through the lens assembly. FIG. 2B illustrates the astigmatic curve of the camera lens assembly according to Embodiment 1, representing a curvature of the tangential image plane and a curvature of the sagittal image plane. FIG. 2C illustrates the distortion curve of the camera lens assembly according to Embodiment 1, representing amounts of distortion at different viewing angles. FIG. 2D illustrates the lateral color curve of the camera lens assembly according to Embodiment 1, representing deviations of different image heights on the image plane after light passes through the lens assembly. It can be seen from FIGS. 2A-2D that the camera lens assembly according to Embodiment 1 can achieve a good imaging quality.

Embodiment 2

Figure 3:
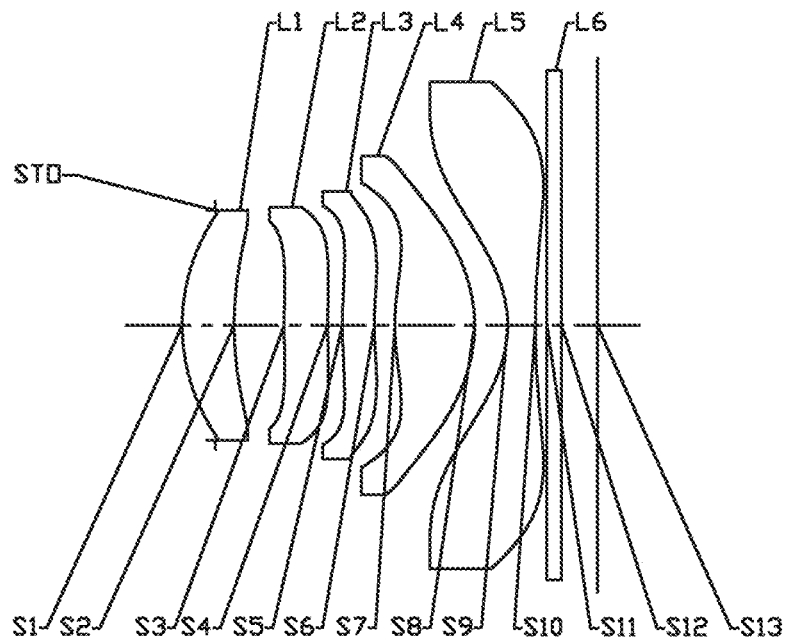
FIG. 3 is a schematic structural diagram illustrating a camera lens assembly according to Embodiment 2 of the present disclosure.

A camera lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the camera lens assembly according to Embodiment 2 of the present disclosure.

As shown in FIG. 3, the camera lens assembly includes, sequentially along an optical axis from an object side to an image side, a first lens L1, a second lens L2, a third lens L3, a fourth lens L4, a fifth lens L5, and an image plane S13.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces. The first lens may be a glass lens, and a thermal expansion coefficient TCE1 of the first lens satisfies: TCE1=3.00×10$^{-6}$/° C.

The second lens L2 has a negative refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a negative refractive power, an object-side surface S5 of the third lens L3 is a convex surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a negative refractive power, an object-side surface S9 of the fifth lens L5 is a concave surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12. Light from an object sequentially passes through the surfaces S1-S12 and finally forms an image on the image plane S13.

Alternatively, a diaphragm STO for limiting light beams may be disposed between the object side and the first lens L1, to improve the imaging quality of the camera lens assembly.

Table 4 shows the surface type, the radius of curvature, the thickness, the material and the conic coefficient of each lens of the camera lens assembly in Embodiment 2. The radius of curvature and the thickness are both shown in millimeters (mm). Table 5 shows the high-order coefficients applicable to each aspheric surface in Embodiment 2. The surface type of each aspheric surface may be defined by the formula (1) given in Embodiment 1, Table 6 shows the total effective focal length f of the camera lens assembly in Embodiment 2, the effective focal lengths f1-f5 of the lenses, the total track length TTL, and the half of the diagonal length ImgH of the effective pixel area on the image plane S13 of the camera lens assembly.

TABLE 4

| surface number | surface type | radius of curvature | thickness | material refractive index | abbe number | conic co-efficient |
|---|---|---|---|---|---|---|
| OBJ | spherical | infinite | 632.0000 | | | |
| STO | spherical | infinite | −0.4750 | | | |
| S1 | aspheric | 2.8793 | 0.7528 | 1.85 | 40.6 | −1.4491 |
| S2 | aspheric | 5.1725 | 0.7239 | | | 0.0000 |
| S3 | aspheric | 28.0156 | 0.6288 | 1.53 | 55.8 | 0.0000 |
| S4 | aspheric | 19.6095 | 0.2131 | | | 24.8144 |
| S5 | aspheric | 6.2628 | 0.4633 | 1.53 | 55.8 | 0.0000 |
| S6 | aspheric | 4.6294 | 0.2964 | | | 0.0000 |
| S7 | aspheric | 3.1745 | 1.1541 | 1.53 | 55.8 | 0.0000 |
| S8 | aspheric | −2.1395 | 0.4782 | | | −0.3875 |
| S9 | aspheric | −1.7330 | 0.4000 | 1.53 | 55.8 | −0.9340 |
| S10 | aspheric | 10.2770 | 0.1702 | | | 0.0000 |
| S11 | spherical | infinite | 0.2100 | 1.52 | 64.2 | |
| S12 | spherical | infinite | 0.5200 | | | |
| S13 | spherical | infinite | | | | |

TABLE 5

| surface number | A4 | A6 | A8 | A10 | A12 |
|---|---|---|---|---|---|
| S1 | 6.5189E−03 | 3.1475E−03 | −1.7389E−03 | 1.3535E−04 | 1.1388E−04 |
| S2 | 3.3538E−03 | −7.6042E−03 | 5.4054E−03 | −2.1681E−03 | 2.0824E−04 |
| S3 | −3.1686E−03 | −4.9523E−02 | 5.9290E−02 | −5.0635E−02 | 2.4109E−02 |
| S4 | −3.0532E−02 | 1.5141E−02 | −1.9576E−02 | 1.0466E−02 | −4.1370E−03 |
| S5 | −8.9103E−02 | 8.1498E−02 | −5.8791E−02 | 2.4212E−02 | −5.8475E−03 |
| S6 | −1.0768E−01 | 6.9169E−03 | 6.0429E−02 | −6.8698E−02 | 3.7333E−02 |
| S7 | −1.0115E−01 | 5.0621E−02 | −3.3714E−02 | 1.4123E−02 | −3.8113E−03 |
| S8 | 1.8898E−02 | −2.7259E−03 | 5.9233E−05 | 7.7954E−05 | 1.5994E−05 |
| S9 | 1.8593E−02 | 1.0344E−03 | −5.1294E−05 | −1.2232E−05 | 7.8180E−07 |
| S10 | −7.1029E−03 | 2.3984E−03 | −7.5319E−04 | 8.8979E−05 | −4.8672E−06 |

| surface number | A14 | A16 | A18 | A20 |
|---|---|---|---|---|
| S1 | −2.6022E−06 | −9.2316E−06 | 0.0000E+00 | 0.0000E+00 |
| S2 | 0.0000E+00 | 0.0000E+00 | 0.0000E+00 | 0.0000E+00 |
| S3 | −6.0651E−03 | 5.8357E−04 | 0.0000E+00 | 0.0000E+00 |
| S4 | 9.1558E−04 | −8.4440E−05 | 0.0000E+00 | 0.0000E+00 |
| S5 | 5.6344E−04 | 0.0000E+00 | 0.0000E+00 | 0.0000E+00 |
| S6 | −1.1544E−02 | 2.0262E−03 | −1.8421E−04 | 6.7776E−06 |
| S7 | 5.8188E−04 | −3.7362E−05 | 0.0000E+00 | 0.0000E+00 |
| S8 | −3.0056E−06 | 0.0000E+00 | 0.0000E+00 | 0.0000E+00 |
| S9 | 0.0000E+00 | 0.0000E+00 | 0.0000E+00 | 0.0000E+00 |
| S10 | 1.0435E−07 | 0.0000E+00 | 0.0000E+00 | 0.0000E+00 |

TABLE 6

| parameter | f (mm) | f1 (mm) | f2 (mm) | f3 (mm) | f4 (mm) | f5 (mm) | TTL (mm) | ImgH (mm) |
|---|---|---|---|---|---|---|---|---|
| numerical value | 4.15 | 6.75 | −127.15 | −37.30 | 2.62 | −2.78 | 6.01 | 3.93 |

Figure 4A:
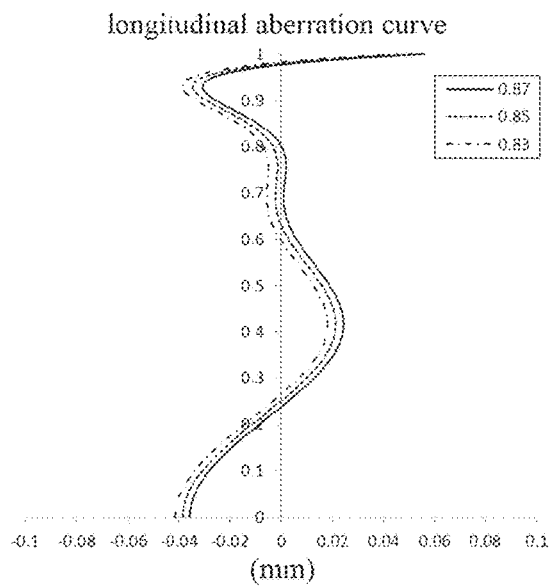
FIGS. 4A-4D respectively illustrate a longitudinal aberration curve, an astigmatic curve, a distortion curve, and a lateral color curve of the camera lens assembly according to Embodiment 2.
Figure 4B:
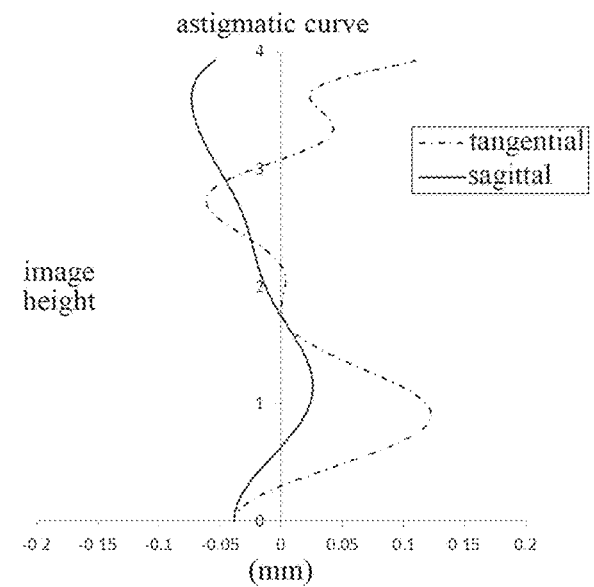
Figure 4C:
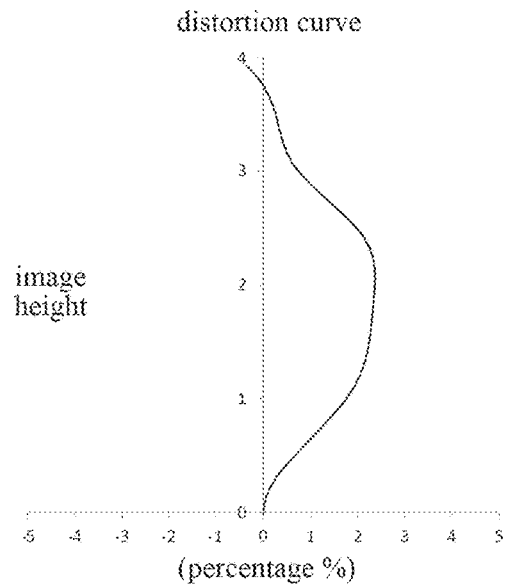
Figure 4D:
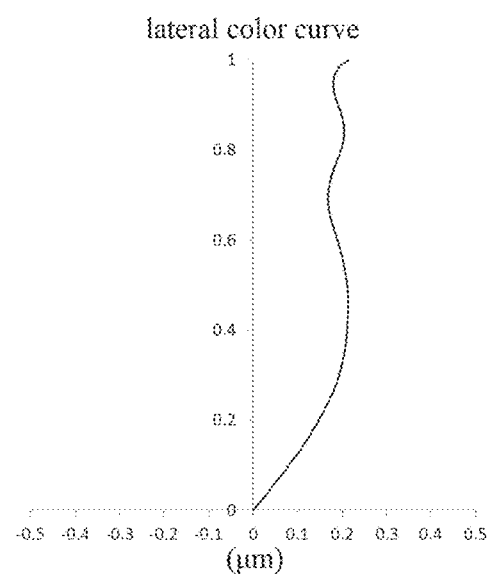

FIG. 4A illustrates the longitudinal aberration curve of the camera lens assembly according to Embodiment 2, representing deviations of the focal points of the light of different wavelengths converged after passing through the lens assembly. FIG. 4B illustrates the astigmatic curve of the camera lens assembly according to Embodiment 2, representing a curvature of the tangential image plane and a curvature of the sagittal image plane. FIG. 4C illustrates the distortion curve of the camera lens assembly according to Embodiment 2, representing amounts of distortion at different viewing angles. FIG. 4D illustrates the lateral color curve of the camera lens assembly according to Embodiment 2, representing deviations of different image heights on the image plane after light passes through the lens assembly. It can be seen from FIGS. 4A-4D that the camera lens assembly according to Embodiment 2 can achieve a good imaging quality.

Embodiment 3

A camera lens assembly according to Embodiment 3 of the present disclosure is described below with reference to FIGS. 5-6D. FIG. 5 is a schematic structural diagram illustrating the camera lens assembly according to Embodiment 3 of the present disclosure.

As shown in FIG. 5, the camera lens assembly includes, sequentially along an optical axis from an object side to an image side, a first lens L1, a second lens L2, a third lens L3, a fourth lens L4, a fifth lens L5, and an image plane S13.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces. The first lens may be a glass lens, and a thermal expansion coefficient TCE1 of the first lens satisfies: $TCE1=0.50 \times 10^{-6}/°C$.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a negative refractive power, an object-side surface S5 of the third lens L3 is a convex surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a negative refractive power, an object-side surface S9 of the fifth lens L5 is a concave surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12. Light from an object sequentially passes through the surfaces S1-S12 and finally forms an image on the image plane S13.

Alternatively, a diaphragm STO for limiting light beams may be disposed between the object side and the first lens L1, to improve the imaging quality of the camera lens assembly.

Table 7 shows the surface type, the radius of curvature, the thickness, the material and the conic coefficient of each lens of the camera lens assembly in Embodiment 3. The radius of curvature and the thickness are both shown in millimeters (mm). Table 8 snows the high-order coefficients applicable to each aspheric surface in Embodiment 3. The surface type of each aspheric surface may be defined by the formula (1) given in Embodiment 1. Table 9 snows the total effective focal length f of the camera lens assembly in Embodiment 3, the effective focal lengths f1-f5 of the lenses, the total track length TTL, and the half of the diagonal length ImgH of the effective pixel area on the image plane S13 of the camera lens assembly.

TABLE 7

| surface number | surface type | radius of curvature | thickness | material refractive index | abbe number | conic coefficient |
|---|---|---|---|---|---|---|
| OBJ | spherical | infinite | 632.0000 | | | |
| STO | spherical | infinite | −0.4500 | | | |
| S1 | aspheric | 2.6094 | 0.6556 | 1.85 | 40.6 | −1.3426 |
| S2 | aspheric | 4.1070 | 0.5188 | | | 0.0000 |
| S3 | aspheric | 6.5524 | 0.5027 | 1.53 | 55.8 | 0.0000 |
| S4 | aspheric | 9.0771 | 0.4436 | | | 10.5835 |
| S5 | aspheric | 4.6886 | 0.4250 | 1.53 | 55.8 | 0.0000 |
| S6 | aspheric | 3.4691 | 0.2965 | | | 0.0000 |
| S7 | aspheric | 3.4890 | 0.7452 | 1.53 | 55.8 | 0.0000 |
| S8 | aspheric | −2.6224 | 0.6487 | | | 0.0413 |
| S9 | aspheric | −1.6348 | 0.4840 | 1.53 | 55.8 | −1.1886 |
| S10 | aspheric | 43.1532 | 0.0500 | | | 0.0000 |
| S11 | spherical | infinite | 0.2100 | 1.52 | 64.2 | |
| S12 | spherical | infinite | 0.5199 | | | |
| S13 | spherical | infinite | | | | |

TABLE 8

| surface number | A4 | A6 | A8 | A10 | A12 |
|---|---|---|---|---|---|
| S1 | 6.7247E−03 | 2.2076E−03 | −1.6798E−03 | 2.7553E−04 | 9.4448E−05 |
| S2 | −4.3739E−04 | −8.0688E−03 | 4.9547E−03 | −2.4407E−03 | 2.1139E−04 |
| S3 | −1.1094E−02 | −4.9746E−02 | 5.9116E−02 | −5.1933E−02 | 2.4005E−02 |
| S4 | −3.7454E−02 | 2.7812E−02 | −4.6799E−02 | 3.2292E−02 | −1.4765E−02 |
| S5 | −1.1469E−01 | 1.2279E−01 | −1.0802E−01 | 5.6497E−02 | −1.6671E−02 |
| S6 | −1.7100E−01 | 1.3112E−01 | −1.0245E−01 | 6.4800E−02 | −3.6412E−02 |
| S7 | −9.5150E−02 | 4.9101E−02 | −3.8285E−02 | 1.8194E−02 | −5.7016E−03 |
| S8 | 1.7033E−02 | −1.7585E−03 | 1.7441E−04 | 8.4306E−05 | 1.4191E−05 |
| S9 | 2.1305E−02 | 6.8609E−04 | −6.8622E−05 | −1.2713E−05 | 8.4420E−07 |
| S10 | −3.7668E−03 | 2.0784E−03 | −7.7393E−04 | 9.2536E−05 | −4.7795E−06 |

| surface number | A14 | A16 | A18 | A20 |
|---|---|---|---|---|
| S1 | −2.7914E−05 | −1.0213E−05 | 0.0000E+00 | 0.0000E+00 |
| S2 | 0.0000E+00 | 0.0000E+00 | 0.0000E+00 | 0.0000E+00 |
| S3 | −6.0692E−03 | 5.8357E−04 | 0.0000E+00 | 0.0000E+00 |
| S4 | 3.7005E−03 | −3.8599E−04 | 0.0000E+00 | 0.0000E+00 |
| S5 | 1.8572E−03 | 0.0000E+00 | 0.0000E+00 | 0.0000E+00 |
| S6 | 1.6617E−02 | −5.1973E−03 | 9.0838E−04 | −6.3376E−05 |
| S7 | 9.7146E−04 | −6.5586E−05 | 0.0000E+00 | 0.0000E+00 |
| S8 | −3.5855E−06 | 0.0000E+00 | 0.0000E+00 | 0.0000E+00 |
| S9 | 0.0000E+00 | 0.0000E+00 | 0.0000E+00 | 0.0000E+00 |
| S10 | 8.7964E−08 | 0.0000E+00 | 0.0000E+00 | 0.0000E+00 |

TABLE 9

| parameter | f (mm) | f1 (mm) | f2 (mm) | f3 (mm) | f4 (mm) | f5 (mm) | TTL (mm) | ImgH (mm) |
|---|---|---|---|---|---|---|---|---|
| numerical value | 4.14 | 7.13 | 41.78 | −28.74 | 2.96 | −2.97 | 5.50 | 3.91 |

FIG. 6A illustrates the longitudinal aberration curve of the camera lens assembly according to Embodiment 3, representing deviations of the focal points of the light of different wavelengths converged after passing through the lens assembly. FIG. 6B illustrates the astigmatic curve of the camera lens assembly according to Embodiment 3, representing a curvature of the tangential image plane and a curvature of the sagittal image plane. FIG. 6C illustrates the distortion curve of the camera lens assembly according to Embodiment 3, representing amounts of distortion at different viewing angles, FIG. 6D illustrates the lateral color curve of the camera lens assembly according to Embodiment 3, representing deviations of different image heights on the image plane after light passes through the lens assembly. It can be seen from FIGS. 6A-6D that the camera lens assembly according to Embodiment 3 can achieve a good imaging quality.

Embodiment 4

A camera lens assembly according to Embodiment 4 of the present disclosure is described below with reference to FIGS. 7-8D. FIG. 7 is a schematic structural diagram illustrating the camera lens assembly according to Embodiment 4 of the present disclosure.

As shown in FIG. 7, the camera lens assembly includes, sequentially along an optical axis from an object side to an image side, a first lens L1, a second lens L2, a third lens L3, a fourth lens L4, a fifth lens L5, and an image plane S13.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces. The first lens may be a glass lens, and a thermal expansion coefficient TCE1 of the first lens satisfies: TCE1=−3.00−$10^{-6}$/° C.

The second lens L2 has a positive refractive power, an object-side surface S3 of the second lens L2 is a convex surface, and an image-side surface S4 of the second lens L2 is a convex surface. The object-side surface S3 and the image-side surface S4 of the second lens L2 are both aspheric surfaces.

The third lens L3 has a negative refractive power, an object-side surface S5 of the third lens L3 is a convex surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a negative refractive power, an object-side surface S9 of the fifth lens L5 is a concave surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12. Light from an object sequentially passes through the surfaces S1-S12 and finally forms an image on the image plane S13.

Alternatively, a diaphragm STO for limiting light beams may be disposed between the object side and the first lens L1, to improve the imaging quality of the camera lens assembly.

Table 10 shows the surface type, the radius of curvature, the thickness, the material and the conic coefficient of each lens of the camera lens assembly in Embodiment 4. The radius of curvature and the thickness are both shown in millimeters (mm). Table 11 shows the high-order coefficients applicable to each aspheric surface in Embodiment 4. The surface type of each aspheric surface may be defined by the formula (1) given in Embodiment 1. Table 12 shows the total effective focal length f of the camera lens assembly in Embodiment 4, the effective focal lengths f1-f5 of the lenses, the total track length TTL, and the half of the diagonal length ImgH of the effective pixel area on the image plane S13 of the camera lens assembly.

TABLE 10

| surface number | surface type | radius of curvature | thickness | material refractive index | abbe number | conic coefficient |
|---|---|---|---|---|---|---|
| OBJ | spherical | infinite | 632.0000 | | | |
| STO | spherical | infinite | −0.4500 | | | |
| S1 | aspheric | 2.6653 | 0.6481 | 1.84 | 40.6 | 0.6793 |
| S2 | aspheric | 4.2867 | 0.5089 | | | 0.0000 |
| S3 | aspheric | 15.2140 | 0.7267 | 1.53 | 55.8 | 0.0000 |
| S4 | aspheric | −49.6513 | 0.4447 | | | 250067.3000 |
| S5 | aspheric | 3.8471 | 0.4250 | 1.53 | 55.8 | 0.0000 |
| S6 | aspheric | 3.1580 | 0.3013 | | | 0.0000 |
| S7 | aspheric | 3.0629 | 0.5947 | 1.53 | 55.8 | 0.0000 |
| S8 | aspheric | −3.8786 | 0.6020 | | | 1.3724 |
| S9 | aspheric | −1.7250 | 0.4453 | 1.53 | 55.8 | −0.7616 |
| S10 | aspheric | 17.2552 | 0.0735 | | | 0.0000 |
| S11 | spherical | infinite | 0.2100 | 1.52 | 64.2 | |
| S12 | spherical | infinite | 0.5200 | | | |
| S13 | spherical | infinite | | | | |

TABLE 11

| surface number | A4 | A6 | A8 | A10 | A12 |
|---|---|---|---|---|---|
| S1 | −6.6359E−03 | 2.2875E−03 | −2.7411E−03 | 7.7598E−04 | −7.2832E−05 |
| S2 | −3.9819E−04 | 2.7714E−03 | −6.1401E−03 | 3.7480E−03 | −1.0730E−03 |
| S3 | −1.8668E−02 | −1.7575E−02 | 2.3595E−02 | −3.1321E−02 | 1.9495E−02 |
| S4 | −5.1407E−02 | 3.4958E−02 | −3.6453E−02 | 1.5422E−02 | −3.2602E−03 |
| S5 | −9.0619E−02 | 6.2510E−02 | −3.5156E−02 | 1.1791E−02 | −2.9736E−03 |
| S6 | −1.4831E−01 | 5.5418E−02 | 2.3494E−02 | −6.6635E−02 | 5.4958E−02 |
| S7 | −5.0370E−02 | −2.2222E−02 | 4.1881E−02 | −3.4812E−02 | 1.4275E−02 |
| S8 | 4.5015E−02 | −8.2903E−03 | 4.2215E−04 | 3.5802E−05 | −2.6671E−05 |
| S9 | 2.4595E−02 | −4.8602E−05 | 1.2046E−04 | −4.2983E−06 | −2.8682E−07 |
| S10 | −1.5663E−02 | 4.5250E−03 | −1.1757E−03 | 1.1989E−04 | −5.1814E−06 |

| surface number | A14 | A16 | A18 | A20 |
|---|---|---|---|---|
| S1 | | 1.6791E−06 | −9.3473E−06 | 0.0000E+00 | 0.0000E+00 |
| S2 | | 0.0000E+00 | 0.0000E+00 | 0.0000E+00 | 0.0000E+00 |
| S3 | | −6.0733E−03 | 5.8139E−04 | 0.0000E+00 | 0.0000E+00 |

TABLE 11-continued

| | | | | |
|---|---|---|---|---|
| S4 | 1.3344E−04 | 3.2435E−05 | 0.0000E+00 | 0.0000E+00 |
| S5 | 2.8392E−04 | 0.0000E+00 | 0.0000E+00 | 0.0000E+00 |
| S6 | −2.4255E−02 | 5.9338E−03 | −7.4751E−04 | 3.7710E−05 |
| S7 | −2.9437E−03 | 2.3943E−04 | 0.0000E+00 | 0.0000E+00 |
| S8 | 4.0924E−06 | 0.0000E+00 | 0.0000E+00 | 0.0000E+00 |
| S9 | 0.0000E+00 | 0.0000E+00 | 0.0000E+00 | 0.0000E+00 |
| S10 | 8.2224E−08 | 0.0000E+00 | 0.0000E+00 | 0.0000E+00 |

TABLE 12

| parameter | f (mm) | f1 (mm) | f2 (mm) | f3 (mm) | f4 (mm) | f5 (mm) | TTL (mm) | ImgH (mm) |
|---|---|---|---|---|---|---|---|---|
| numerical value | 4.14 | 7.12 | 22.16 | −42.46 | 3.34 | −2.95 | 5.50 | 3.93 |

Figure 8A:
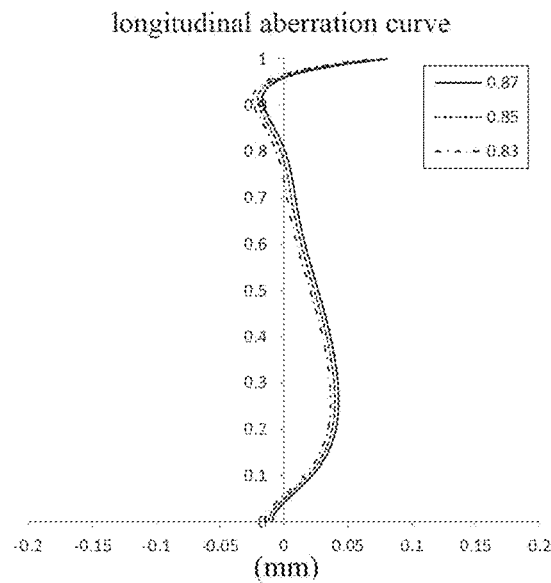
FIGS. 8A-8D respectively illustrate a longitudinal aberration curve, an astigmatic curve, a distortion curve, and a lateral color curve of the camera lens assembly according to Embodiment 4.
Figure 8B:
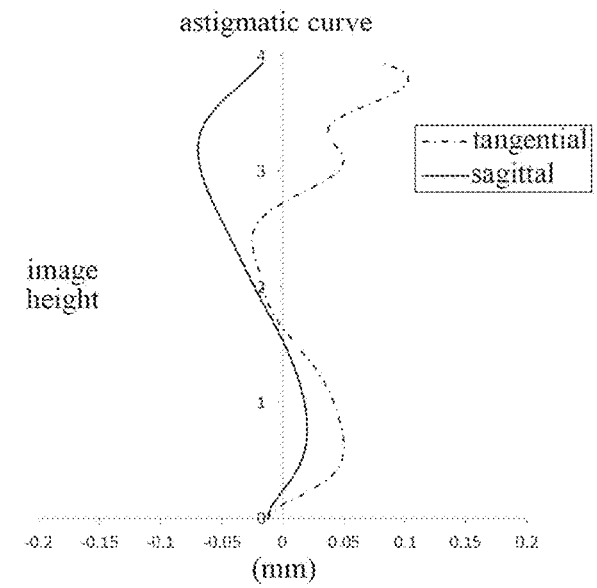
Figure 8C:
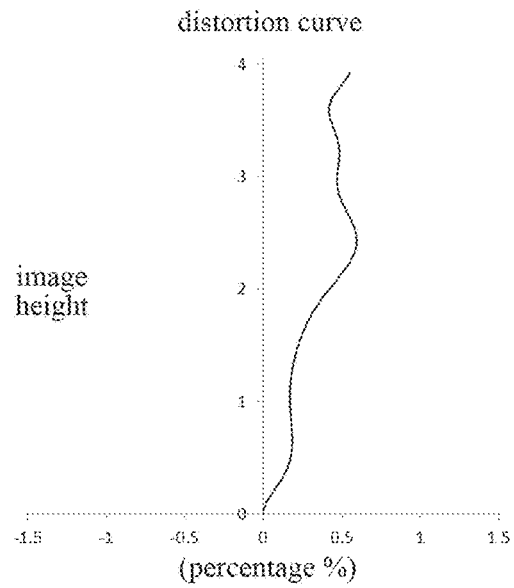
Figure 8D:
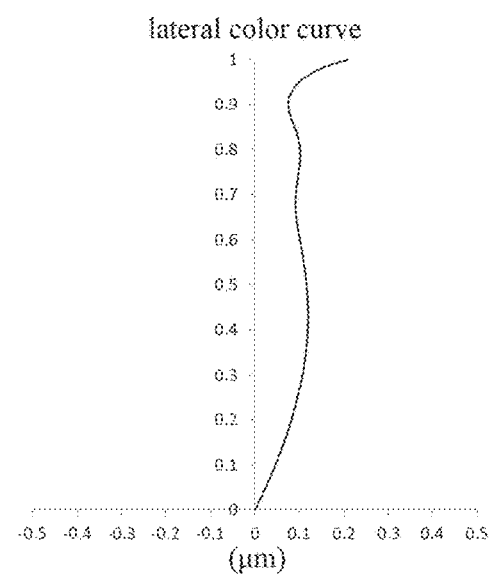

FIG. 8A illustrates the longitudinal aberration curve of the camera lens assembly according to Embodiment 4, representing deviations of the focal points of the light of different wavelengths converged after passing through the lens assembly. FIG. 8B illustrates the astigmatic curve of the camera lens assembly according to Embodiment 4, representing a curvature of the tangential image plane and a curvature of the sagittal image plane. FIG. 8C illustrates the distortion curve of the camera lens assembly according to Embodiment 4, representing amounts of distortion at different viewing angles. FIG. 8D illustrates the lateral color curve of the camera lens assembly according to Embodiment 4, representing deviations of different image heights on the image plane after light passes through the lens assembly. It can be seen from FIGS. 8A-8D that the camera lens assembly according to Embodiment 4 can achieve a good imaging quality.

Embodiment 5

A camera lens assembly according to Embodiment 5 of the present disclosure is described below with reference to FIGS. 9-10D. FIG. 9 is a schematic structural diagram illustrating the camera lens assembly according to Embodiment 5 of the present disclosure.

As shown in FIG. 9, the camera lens assembly includes, sequentially along an optical axis from an object side to an image side, a first lens L1, a second lens L2, a third lens L3, a fourth lens L4, a fifth lens L5, and an image plane S13.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces. The first lens may be a glass lens, and a thermal expansion coefficient TCE1 of the first lens satisfies: TCE1=6.10× $10^{-6}$/° C.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a negative refractive power, an object-side surface S5 of the third lens L3 is a concave surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a negative refractive power, an object-side surface S9 of the fifth lens L5 is a concave surface, and an image-side surface S10 of the fifth lens L5 is a concave surface. The object-side surface S9 and the image-side surface S10 of the fifth lens L5 are both aspheric surfaces.

Alternatively, the camera lens assembly may further include an optical filter L6 having an object-side surface S11 and an image-side surface S12. Light from an object sequentially passes through the surfaces S1-S12 and finally forms an image on the image plane S13.

Alternatively, a diaphragm STO for limiting light beams may be disposed between the object side and the first lens L1, to improve the imaging quality of the camera lens assembly.

Table 13 shows the surface type, the radius of curvature, the thickness, the material and the conic coefficient of each lens of the camera lens assembly in Embodiment 5. The radius of curvature and the thickness are both shown in millimeters (mm). Table 14 shows the high-order coefficients applicable to each aspheric surface in Embodiment 5. The surface type of each aspheric surface may be defined by the formula (1) given in Embodiment 1. Table 15 shows the total effective focal length f of the camera lens assembly in Embodiment 5, the effective focal lengths f1-f5 of the lenses, the total track length TTL, and the half of the diagonal length ImgH of the effective pixel area on the image plane S13 of the camera lens assembly.

TABLE 13

| | | | | material | | |
|---|---|---|---|---|---|---|
| surface number | surface type | radius of curvature | thickness | refractive index | abbe number | conic coefficient |
| OBJ | spherical | infinite | 632.0000 | | | |
| STO | spherical | infinite | −0.4500 | | | |
| S1 | aspheric | 2.6218 | 0.6814 | 1.85 | 40.6 | −1.2652 |
| S2 | aspheric | 4.5720 | 0.5665 | | | 0.0000 |
| S3 | aspheric | 10.6974 | 0.6048 | 1.53 | 55.8 | 0.0000 |
| S4 | aspheric | 20.1878 | 0.3747 | | | 49.9893 |
| S5 | aspheric | −125.0000 | 0.4250 | 1.53 | 55.8 | 0.0000 |
| S6 | aspheric | 4.6240 | 0.1015 | | | 0.0000 |
| S7 | aspheric | 2.9763 | 0.7529 | 1.53 | 55.8 | 0.0000 |
| S8 | aspheric | −2.3982 | 0.7400 | | | −0.0714 |
| S9 | aspheric | −1.7241 | 0.4655 | 1.53 | 55.8 | −1.1414 |
| S10 | aspheric | 115.2872 | 0.0576 | | | 0.0000 |
| S11 | spherical | infinite | 0.2100 | 1.52 | 64.2 | |
| S12 | spherical | infinite | 0.5200 | | | |
| S13 | spherical | infinite | | | | |

TABLE 14

| surface number | A4 | A6 | A8 | A10 | A12 |
|---|---|---|---|---|---|
| S1 | 7.4481E−03 | 2.3695E−03 | −1.7102E−03 | 2.7989E−04 | 1.0517E−04 |
| S2 | 5.2190E−04 | −7.0815E−03 | 4.6821E−03 | −2.6817E−03 | 2.8967E−04 |
| S3 | −8.5768E−03 | −5.2612E−02 | 5.9592E−02 | −5.1104E−02 | 2.3818E−02 |
| S4 | 2.5316E−03 | −2.7855E−02 | 7.1619E−03 | 1.1733E−03 | −4.9855E−03 |
| S5 | 7.1424E−03 | −1.7246E−02 | 5.1000E−04 | 7.9751E−03 | −6.1490E−03 |
| S6 | −1.2877E−01 | 7.2443E−02 | −1.9044E−02 | −5.3987E−02 | 7.2132E−02 |
| S7 | −1.4253E−01 | 1.1735E−01 | −1.2129E−01 | 7.6677E−02 | −2.9575E−02 |
| S8 | 2.7654E−02 | −3.9650E−03 | 2.3058E−04 | 1.6770E−04 | 2.2817E−05 |
| S9 | 2.1215E−02 | 6.2763E−04 | −6.8766E−05 | −1.1805E−05 | 8.1047E−07 |
| S10 | −3.1837E−03 | 1.8511E−03 | −6.9582E−04 | 8.8200E−05 | −5.0572E−06 |

| surface number | A14 | A16 | A18 | A20 |
|---|---|---|---|---|
| S1 | −3.9246E−05 | −1.0213E−05 | 0.0000E+00 | 0.0000E+00 |
| S2 | 0.0000E+00 | 0.0000E+00 | 0.0000E+00 | 0.0000E+00 |
| S3 | −6.0692E−03 | 5.8357E−04 | 0.0000E+00 | 0.0000E+00 |
| S4 | 2.2091E−03 | −3.0307E−04 | 0.0000E+00 | 0.0000E+00 |
| S5 | 1.0345E−03 | 0.0000E+00 | 0.0000E+00 | 0.0000E+00 |
| S6 | −4.2531E−02 | 1.3307E−02 | −2.1615E−03 | 1.4634E−04 |
| S7 | 6.1109E−03 | −5.1182E−04 | 0.0000E+00 | 0.0000E+00 |
| S8 | −6.9303E−06 | 0.0000E+00 | 0.0000E+00 | 0.0000E+00 |
| S9 | 0.0000E+00 | 0.0000E+00 | 0.0000E+00 | 0.0000E+00 |
| S10 | 1.0803E−07 | 0.0000E+00 | 0.0000E+00 | 0.0000E+00 |

TABLE 15

| parameter | f (mm) | f1 (mm) | f2 (mm) | f3 (mm) | f4 (mm) | f5 (mm) | TTL (mm) | ImgH (mm) |
|---|---|---|---|---|---|---|---|---|
| numerical value | 4.15 | 6.34 | 42.20 | −8.44 | 2.65 | −3.22 | 5.50 | 3.91 |

FIG. 10A illustrates the longitudinal aberration curve of the camera lens assembly according to Embodiment 5, representing deviations of the focal points of the light of different wavelengths converged after passing through the lens assembly. FIG. 10B illustrates the astigmatic curve of the camera lens assembly according to Embodiment 5, representing a curvature of the tangential image plane and a curvature of the sagittal image plane. FIG. 10C illustrates the distortion curve of the camera lens assembly according to Embodiment 5, representing amounts of distortion at different viewing angles. FIG. 10D illustrates the lateral color curve of the camera lens assembly according to Embodiment 5, representing deviations of different image heights on the image plane after light passes through the lens assembly. It can be seen from FIGS. 10A-10D that the camera lens assembly according to Embodiment 5 can achieve a good imaging quality.

Embodiment 6

A camera lens assembly according to Embodiment 6 of the present disclosure is described below with reference to FIGS. 11-12D. FIG. 11 is a schematic structural diagram illustrating the camera lens assembly according to Embodiment 6 of the present disclosure.

As shown in FIG. 11, the camera lens assembly includes, sequentially along an optical axis from an object side to an image side, a first lens L1, a second lens L2, a third lens L3, a fourth lens L4, a fifth lens L5, and an image plane S13.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces. The first lens may be a glass lens, and a thermal expansion coefficient TCE1 of the first lens satisfies: TCE1=3.70×$10^{-6}$/° C.

The second lens L2 has a positive refractive power, an object-side surface S3 of the second lens L2 is a concave surface, and an image-side surface S4 of the second lens L2 is a convex surface. The object-side surface S3 and the image-side surface S4 of the second lens L2 are both aspheric surfaces.

The third lens L3 has a negative refractive power, an object-side surface S5 of the third lens L3 is a convex surface, and an image-side surface S6 of the third lens L3 is a concave surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a convex surface. The object-side surface S7 and the image-side surface S8 of the fourth lens L4 are both aspheric surfaces.

The fifth lens L5 has a negative refractive power, an object-side surface S9 of the fifth lens L5 is a concave surface, and an image-side surface S10 of the fifth lens L5 is a convex surface. The object-side surface S9 and the image-side surface S10 of the fifth lens L5 are both aspheric surfaces.

Alternatively, the camera lens assembly may further include an optical filter L6 having an object-side surface S11 and an image-side surface S12. Light from an object sequentially passes through the surfaces S1-S12 and finally forms an image on the image plane S13.

Alternatively, a diaphragm STO for limiting light beams may be disposed between the object side and the first lens L1, to improve the imaging quality of the camera lens assembly.

Table 16 shows the surface type, the radius of curvature, the thickness, the material and the conic coefficient of each lens of the camera lens assembly in Embodiment 6. The radius of curvature and the thickness are both shown in millimeters (mm). Table 17 shows the high-order order coefficients applicable to each aspheric surface in Embodiment 6. The surface type of each aspheric surface may be defined by the formula (1) given in Embodiment 1. Table 18 shows the total effective focal length f of the camera lens assembly in Embodiment 6, the effective focal lengths f1-f5 of the lenses, the total track length TTL, and the half of the diagonal length ImgH of the effective pixel area on the image plane S13 of the camera lens assembly.

TABLE 16

| surface number | surface type | radius of curvature | thickness | material refractive index | abbe number | conic coefficient |
|---|---|---|---|---|---|---|
| OBJ | spherical | infinite | 632.0000 | | | |
| STO | spherical | infinite | −0.4500 | | | |
| S1 | aspheric | 2.6923 | 0.7182 | 1.85 | 40.6 | −1.2814 |
| S2 | aspheric | 5.1725 | 0.6143 | | | 0.0000 |
| S3 | aspheric | −126.0810 | 0.6588 | 1.53 | 55.8 | 0.0000 |
| S4 | aspheric | −51.0563 | 0.2615 | | | 99.5331 |
| S5 | aspheric | 17.5198 | 0.4250 | 1.53 | 55.8 | 0.0000 |
| S6 | aspheric | 3.9829 | 0.1587 | | | 0.0000 |
| S7 | aspheric | 2.7851 | 0.6981 | 1.53 | 55.8 | 0.0000 |
| S8 | aspheric | −2.6451 | 0.7150 | | | −0.0652 |
| S9 | aspheric | −1.6751 | 0.4704 | 1.53 | 55.8 | −1.1353 |
| S10 | aspheric | −82.0468 | 0.0500 | | | 0.0000 |
| S11 | spherical | infinite | 0.2100 | 1.52 | 64.2 | |
| S12 | spherical | infinite | 0.5200 | | | |
| S13 | spherical | infinite | | | | |

TABLE 17

| surface number | A4 | A6 | A8 | A10 | A12 |
|---|---|---|---|---|---|
| S1 | 7.3799E−03 | 2.4893E−03 | −1.6861E−03 | 2.8000E−04 | 1.0910E−04 |
| S2 | 9.4031E−04 | −6.6069E−03 | 4.9252E−03 | −2.6603E−03 | 2.5390E−04 |
| S3 | 9.5265E−04 | −9.5815E−02 | 1.3691E−01 | −1.2618E−01 | 6.2684E−02 |
| S4 | −4.5325E−03 | −8.3016E−03 | −2.3432E−02 | 2.3604E−02 | −1.3308E−02 |
| S5 | −2.3265E−02 | 4.4086E−02 | −5.9364E−02 | 3.6741E−02 | −1.2658E−02 |
| S6 | −1.9837E−01 | 2.8300E−01 | −3.5992E−01 | 2.9724E−01 | −1.6084E−01 |
| S7 | −1.4764E−01 | 1.5332E−01 | −1.6266E−01 | 1.0060E−01 | −3.6619E−02 |
| S8 | 2.9384E−02 | −5.3307E−03 | 7.0251E−05 | 1.6645E−04 | 2.4458E−05 |
| S9 | 2.1522E−02 | 6.6265E−04 | −6.3204E−05 | −1.1279E−05 | 8.1851E−07 |
| S10 | 1.5191E−03 | 1.1740E−03 | −6.7346E−04 | 8.7332E−05 | −5.0294E−06 |

| surface number | A14 | A16 | A18 | A20 |
|---|---|---|---|---|
| S1 | −3.6239E−05 | −9.0662E−06 | 0.0000E+00 | 0.0000E+00 |
| S2 | 0.0000E+00 | 0.0000E+00 | 0.0000E+00 | 0.0000E+00 |
| S3 | −1.5418E−02 | 1.2432E−03 | 0.0000E+00 | 0.0000E+00 |
| S4 | 3.8596E−03 | −4.5369E−04 | 0.0000E+00 | 0.0000E+00 |
| S5 | 1.5945E−03 | 0.0000E+00 | 0.0000E+00 | 0.0000E+00 |
| S6 | 5.7080E−02 | −1.3074E−02 | 1.7694E−03 | −1.0568E−04 |
| S7 | 7.0344E−03 | −5.4492E−04 | 0.0000E+00 | 0.0000E+00 |
| S8 | −6.7553E−06 | 0.0000E+00 | 0.0000E+00 | 0.0000E+00 |
| S9 | 0.0000E+00 | 0.0000E+00 | 0.0000E+00 | 0.0000E+00 |
| S10 | 1.2242E−07 | 0.0000E+00 | 0.0000E+00 | 0.0000E+00 |

TABLE 18

| parameter | f (mm) | f1 (mm) | f2 (mm) | f3 (mm) | f4 (mm) | f5 (mm) | TTL (mm) | ImgH (mm) |
|---|---|---|---|---|---|---|---|---|
| numerical value | 4.15 | 5.93 | 162.13 | −9.88 | 2.69 | −3.25 | 5.50 | 3.90 |

Figure 12A:
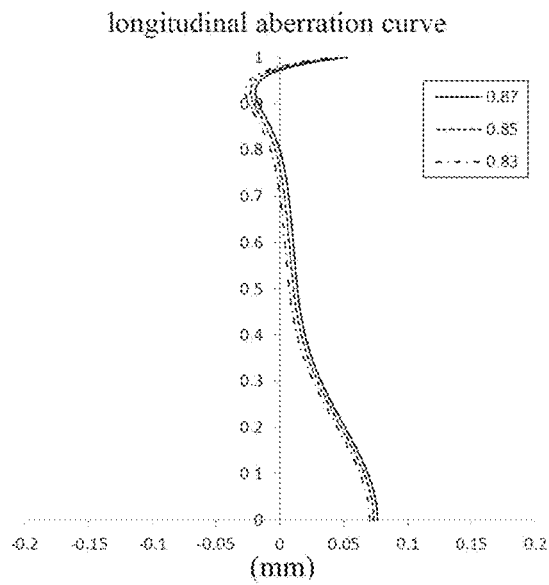
FIGS. 12A-12D respectively illustrate a longitudinal aberration curve, an astigmatic curve, a distortion curve, and a lateral color curve of the camera lens assembly according to Embodiment 6.
Figure 12B:
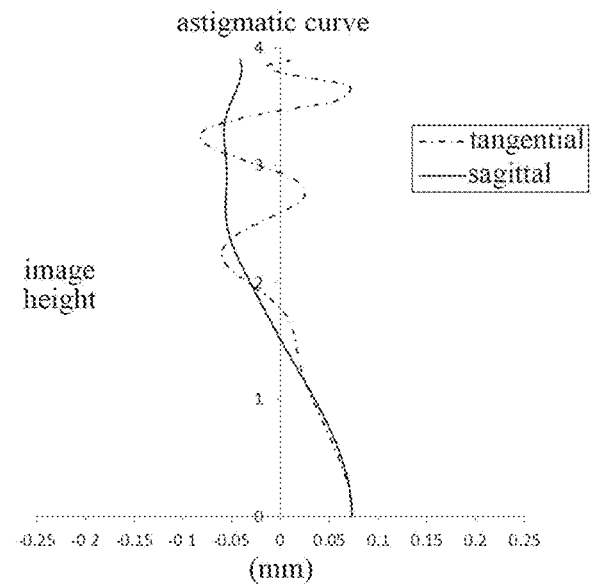
Figure 12C:
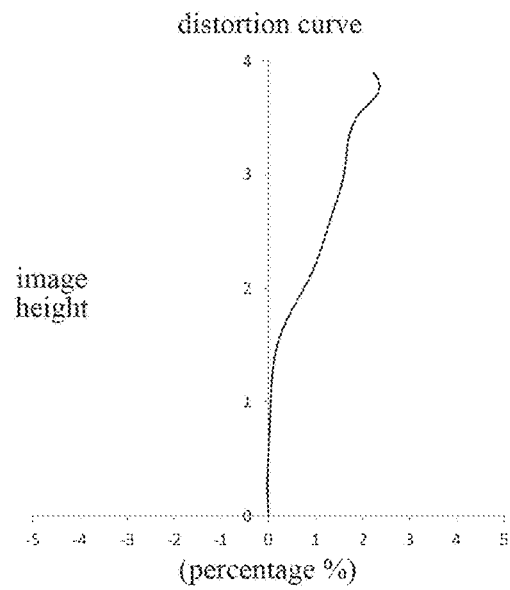
Figure 12D:
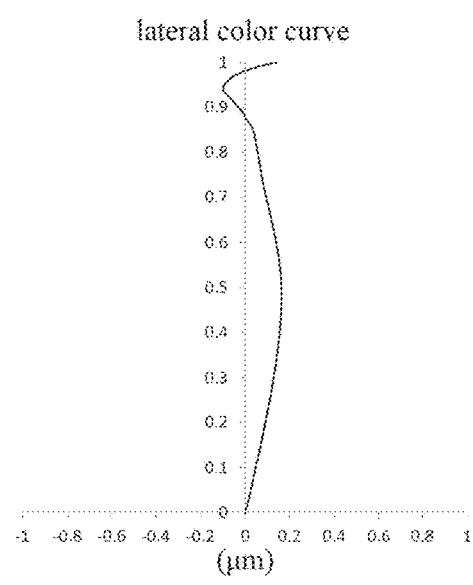

FIG. 12A illustrates the longitudinal aberration curve of the camera lens assembly according to Embodiment 6, representing deviations of the focal points of the light of different wavelengths converged after passing through the lens assembly. FIG. 12B illustrates the astigmatic curve of the camera lens assembly according to Embodiment 6, representing a curvature of the tangential image plane and a curvature of the sagittal image plane. FIG. 12C illustrates the distortion curve of the camera lens assembly according to Embodiment 6, representing amounts of distortion at different viewing angles. FIG. 12D illustrates the lateral color curve of the camera lens assembly according to Embodiment 6, representing deviations of different image heights on the image plane after light passes through the lens assembly. It can be seen from FIGS. 12A-12D that the camera lens assembly according to Embodiment 6 can achieve a good imaging quality.

To sum up, Embodiments 1-6 respectively satisfy the relationships shown in Table 19 below.

TABLE 19

| Conditional Expression | Embodiment 1 | 2 | 3 | 4 | 5 | 6 |
|---|---|---|---|---|---|---|
| f/EPD | 1.30 | 1.26 | 1.29 | 1.38 | 1.30 | 1.36 |
| TTL/ImgH | 1.39 | 1.53 | 1.41 | 1.40 | 1.41 | 1.41 |
| f1/f | 1.74 | 1.63 | 1.72 | 1.72 | 1.53 | 1.43 |
| CT1/CT4 | 0.96 | 0.65 | 0.88 | 1.09 | 0.91 | 1.03 |
| CT3/CT5 | 1.03 | 1.16 | 0.88 | 0.95 | 0.93 | 0.90 |
| T34/(T12 + T23) | 0.27 | 0.32 | 0.31 | 0.32 | 0.11 | 0.18 |
| R8/R9 | 1.75 | 1.23 | 1.60 | 2.25 | 1.39 | 1.58 |
| (R1 + R2)/(R1 − R2) | −4.48 | −3.51 | −4.48 | −4.29 | −3.69 | −3.17 |
| R9/f5 | 0.52 | 0.62 | 0.55 | 0.59 | 0.54 | 0.52 |
| R9/f | −0.38 | −0.42 | −0.40 | −0.42 | −0.42 | −0.40 |

TABLE 19-continued

| Conditional Expression | Embodiment 1 | 2 | 3 | 4 | 5 | 6 |
|---|---|---|---|---|---|---|
| DT52/ImgH | 0.85 | 0.90 | 0.89 | 0.81 | 0.89 | 0.86 |
| SAG51/SAG52 | 1.01 | 1.77 | 0.96 | 1.20 | 0.95 | 1.29 |
| TCE1(10−6/° C.) | 6.50 | 3.00 | 0.50 | −3.00 | 6.10 | 3.70 |

The present disclosure further provides a camera device, having a photosensitive element which may be a photosensitive charge-coupled device (CCD) or complementary metal-oxide semiconductor (CMOS) element. The camera device may be an independent camera device such as a digital camera, or may be a camera module integrated in a mobile electronic device such as a mobile phone or tablet computer. The camera device is equipped with the camera lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A camera lens assembly comprising, sequentially along an optical axis from an object side to an image side, a first lens, a second lens, a third lens, a fourth lens, and a fifth lens,
   wherein the first lens has a positive refractive power, an object-side surface of the first lens is a convex surface, and an image-side surface of the first lens is a concave surface;
   each of the second lens and the third lens has a positive refractive power or a negative refractive power;
   the fourth lens has a positive refractive power, and an image-side surface of the fourth lens is a convex surface;
   the fifth lens has a negative refractive power, and an object-side surface of the fifth lens is a concave surface; and
   an effective semi-diameter DT52 of an image-side surface of the fifth lens and half of a diagonal length ImgH of an effective pixel area on an image plane of the camera lens assembly satisfy: $0.75<DT52/ImgH<1$,
   wherein a radius of curvature R8 of the image-side surface of the fourth lens and a radius of curvature R9 of the object-side surface of the fifth lens satisfy: $1.2<R8/R9<3.5$; and
   wherein an axial distance TTL from the object-side surface of the first lens to an image plane of the camera lens assembly and half of the diagonal length ImgH of the effective pixel area on the image plane of the camera lens assembly satisfy: $TTL/ImgH<1.6$.

2. The camera lens assembly according to claim 1, wherein a total effective focal length f of the camera lens assembly and an entrance pupil diameter EPD of the camera lens assembly satisfy: $f/EPD<1.6$.

3. The camera lens assembly according to claim 1, wherein an effective focal length f1 of the first lens and a total effective focal length f of the camera lens assembly satisfy: $1.4<f1/f<2$.

4. The camera lens assembly according to claim 1, wherein a radius of curvature R1 of the object-side surface of the first lens and a radius of curvature R2 of the image-side surface of the first lens satisfy: $-5<(R1+R2)/(R1-R2)<-3$.

5. The camera lens assembly according to claim 1, wherein the radius of curvature R9 of the object-side surface of the fifth lens and a total effective focal length f of the camera lens assembly satisfy: $R9/f-0.5$.

6. The camera lens assembly according to claim 1, wherein a center thickness CT1 of the first lens on the optical axis and a center thickness CT4 of the fourth lens on the optical axis satisfy: $0.6<CT1/CT4<1.1$.

7. The camera lens assembly according to claim 1, satisfying $0.8<SAG51/SAG52<1.8$,
   wherein SAG51 is a distance on the optical axis from an intersection of the object-side surface of the fifth lens and the optical axis to a vertex of an effective semi-diameter of the object-side surface of the fifth lens, and
   SAG52 is a distance on the optical axis from an intersection of the image-side surface of the fifth lens and the optical axis to a vertex of the effective semi-diameter of the image-side surface of the fifth lens.

8. The camera lens assembly according to claim 1, wherein the first lens is a glass lens, and a thermal expansion coefficient TCE1 of the first lens satisfies: $TCE1<15\times10^{-6}/°C$.

9. A camera lens assembly comprising, sequentially along an optical axis from an object side to an image side, a first lens, a second lens, a third lens, a fourth lens, and a fifth lens, the five lenses having refractive powers,
   wherein an object-side surface of the first lens is a convex surface, and an image-side surface of the first lens is a concave surface;
   at least one of an object-side surface of the second lens and an image-side surface of the second lens is a convex surface;
   at least one of an object-side surface of the third lens and an image-side surface of the third lens is a concave surface;
   the fourth lens has a positive refractive power, and an image-side surface of the fourth lens is a convex surface; and
   the fifth lens has a negative refractive power, an object-side surface of the fifth lens is a concave surface, and the fifth lens satisfies: $0.8<SAG51/SAG52<1.8$,
   wherein SAG51 is a distance on the optical axis from an intersection of the object-side surface of the fifth lens and the optical axis to a vertex of an effective semi-diameter of the object-side surface of the fifth lens, and
   SAG52 is a distance on the optical axis from an intersection of an image-side surface of the fifth lens and the optical axis to a vertex of an effective semi-diameter of the image-side surface of the fifth lens, and
   wherein a radius of curvature R8 of the image-side surface of the fourth lens and a radius of curvature R9 of the object-side surface of the fifth lens satisfy: $1.2<R8/R9<3.5$.

10. The camera lens assembly according to claim 9, wherein an effective focal length f1 of the first lens and a total effective focal length f of the camera lens assembly satisfy: $1.4<f1/f<2$.

11. The camera lens assembly according to claim 9, wherein a radius of curvature R1 of the object-side surface of the first lens and a radius of curvature R2 of the image-side surface of the first lens satisfy:

$-5<(R1+R2)/(R1-R2)<-3$.

12. The camera lens assembly according to claim 9, wherein an axial distance TTL from the object-side surface of the first lens to an image plane of the camera lens assembly and half of a diagonal length ImgH of an effective pixel area on the image plane of the camera lens assembly satisfy: $TTL/ImgH<1.6$.

13. The camera lens assembly according to claim 9, wherein a radius of curvature R9 of the object-side surface of the fifth lens and an effective focal length f5 of the fifth lens satisfy: $0<R9/f5<0.8$.

14. The camera lens assembly according to claim 9, wherein a center thickness CT3 of the third lens on the optical axis and a center thickness CT5 of the fifth lens on the optical axis satisfy: $0.8<CT3/CT5<1.2$.

15. A camera lens assembly comprising, sequentially along an optical axis from an object side to an image side, a first lens, a second lens, a third lens, a fourth lens, and a fifth lens,
- wherein the first lens has a positive refractive power, an object-side surface of the first lens is a convex surface, and an image-side surface of the first lens is a concave surface;
- each of the second lens and the third lens has a positive refractive power or a negative refractive power;
- the fourth lens has a positive refractive power, and an image-side surface of the fourth lens is a convex surface; and
- the fifth lens has a negative refractive power, and an object-side surface of the fifth lens is a concave surface;
- wherein a total effective focal length f of the camera lens assembly and an entrance pupil diameter EPD of the camera lens assembly satisfy: $f/EPD<1.6$;
- an axial distance TTL from the object-side surface of the first lens to an image plane of the camera lens assembly and half of a diagonal length ImgH of an effective pixel area on the image plane of the camera lens assembly satisfy: $TTL/ImgH<1.6$, and
- wherein a radius of curvature R8 of the image-side surface of the fourth lens and the radius of curvature R9 of the object-side surface of the fifth lens satisfy: $1.2<R8/R9<3.5$.

16. The camera lens assembly according to claim 15, wherein a spacing distance T12 on the optical axis between the first lens and the second lens, a spacing distance T23 on the optical axis between the second lens and the third lens, and a spacing distance T34 on the optical axis between the third lens and the fourth lens satisfy: $0.1<T34/(T12+T23)<0.5$.

17. The camera lens assembly according to claim 15, wherein the radius of curvature R9 of the object-side surface of the fifth lens and an effective focal length f5 of the fifth lens satisfy: $0<R9/f5<0.8$.

18. The camera lens assembly according to claim 15, wherein an effective semi-diameter DT52 of an image-side surface of the fifth lens and the half of the diagonal length ImgH of the effective pixel area on the image plane of the camera lens assembly satisfy: $0.75<DT52/ImgH<1$.

* * * * *